United States Patent

Kuno

[11] Patent Number: 6,067,624
[45] Date of Patent: *May 23, 2000

[54] IMAGE INPUT SYSTEM, IMAGE SERVER APPARATUS AND CONTROL METHOD THEREOF

[75] Inventor: Tomoko Kuno, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/897,885

[22] Filed: Jul. 21, 1997

[30] Foreign Application Priority Data

Jul. 22, 1996 [JP] Japan .................................. 8-192585

[51] Int. Cl.⁷ ..................................................... H04N 1/00
[52] U.S. Cl. .......................... 713/202; 713/201; 713/200
[58] Field of Search .................................. 713/200, 201, 713/202; 340/825.06; 399/8

[56] References Cited

U.S. PATENT DOCUMENTS

| | | |
|---|---|---|
| 4,755,938 | 7/1988 | Takahashi et al. ....................... 395/729 |
| 5,442,749 | 8/1995 | Northcutt et al. .................. 395/200.49 |
| 5,546,164 | 8/1996 | Hayashi ....................................... 399/8 |
| 5,553,242 | 9/1996 | Russell et al. ..................... 395/200.51 |

*Primary Examiner*—Ly V. Hua
*Attorney, Agent, or Firm*—Morgan & Finnegan, L.L.P.

[57] ABSTRACT

A plurality of client apparatuses, which issue a request to obtain a control privilege, are registered in a camera control queue provided to obtain the control privilege of controlling an image sensing apparatus. When it is detected that one of the plurality of client apparatuses registered in the queue has issued a control request to control the image sensing apparatus, it is determined whether or not the client apparatus who has issued the control request possesses the control privilege. If the client apparatus does not possess the control privilege, it is determined whether or not shifting of the control privilege should be executed based on a control-privilege possessing time of a client apparatus which currently has the privilege. When it is determined that shifting of the control privilege should be executed, contents of the queue is updated, whereby shifting the camera control privilege. Accordingly, the control privilege of the image sensing apparatus is appropriately managed in response to a plurality of requests to control the image sensing apparatus, and more particularly, the period of control-privilege possessing time is controlled appropriately in correspondence with a volume of traffic of control requests issued by clients.

33 Claims, 16 Drawing Sheets

FIG. 10

| CAMERA-CONTROL CLIENT ID (41) | PRIORITY LEVEL (42) | CAMERA CONTROLLABLE TIME (43) |
|---|---|---|
| 101 | 3 | 15 |
| 105 | 5 | 20 |
| 112 | 2 | 10 |
|  |  |  |
|  |  |  |

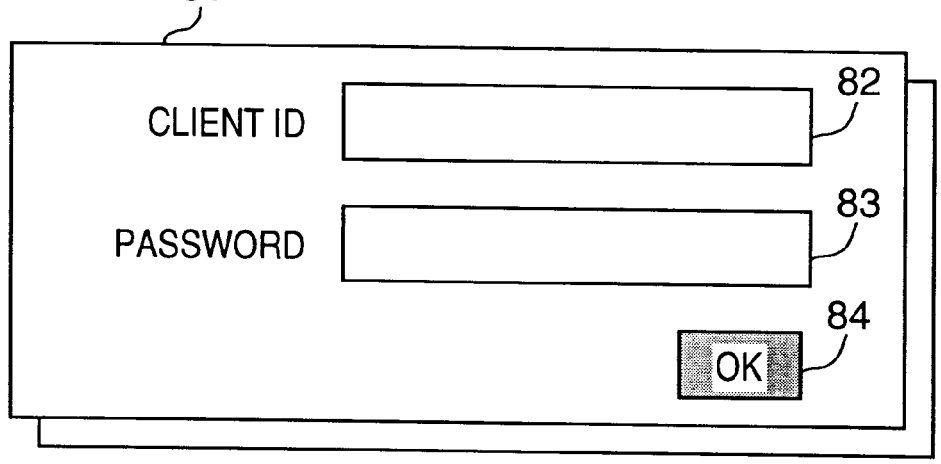

| CLIENT ID | EVALUATION VALUE |
|---|---|
| 112 | |
| 115 | |
| 113 | |
| ⋮ | |

1501 1502

IMAGE INPUT SYSTEM, IMAGE SERVER APPARATUS AND CONTROL METHOD THEREOF

BACKGROUND OF THE INVENTION

The present invention relates to an image input system where a plurality of users can perform remote operation, and an image input control apparatus and method thereof.

As exemplified by a monitoring camera apparatus, there is a system available for remotely controlling an image input apparatus. In the apparatus of this type, the number of image input apparatuses is a lot larger than the number of users who control them. Therefore, there has not been a need to simultaneously control a single image input apparatus by plural users.

However, as the Internet has recently been widely used, there is an increasing demand to enable plural users to view an image inputted by a single image input apparatus, or enable plural users to simultaneously control the image input apparatus. In this case, a mechanism is necessary to manage a plurality of requests sent from remote locations to control the image input apparatus. Furthermore, in a case where a plurality of users attempt to control one image input apparatus, it is obvious that operational conflicts will occur among the plurality of users. Accordingly, it is necessary to appropriately manage and control a privilege to operate the image input apparatus.

SUMMARY OF THE INVENTION

The present invention has been made in consideration of the above situation, and has as its object to provide an image input system, a control apparatus for an image input apparatus and control method thereof for managing a control privilege of an image sensing apparatus in response to a plurality of control requests to control the image sensing apparatus.

Another object of the present invention is to provide an image input system, an image input apparatus and control method for appropriately controlling a time period one client can keep the control privilege, in accordance with a receiving state of control requests.

In order to attain the above objects, the image input system of the present invention comprises: registering means for registering a plurality of clients, who have issued an obtain request to obtain a control privilege, in a waiting queue for obtaining the control privilege of an image sensing apparatus; detecting means for detecting issuance of a control request of controlling the image sensing apparatus from one of the plurality of clients who have been registered by the registering means; determining means for, in a case where the client, who is an issuer of the control request detected by the detecting means, does not possess the control privilege, determining whether or not shifting of the control privilege should be executed on the basis of a control-privilege possessing time of a client who currently has the control privilege; and updating means for updating contents of the waiting queue when the determining means determines to execute shifting of the control privilege.

Moreover, the image server apparatus according to the present invention which attains the above objects is an image server apparatus connectable with a plurality of clients via a network, and comprises: registering means for registering a plurality of clients, who have issued an obtain request to obtain a control privilege, in a waiting queue for obtaining the control privilege of an image sensing apparatus; detecting means for detecting issuance of a control request of controlling the image sensing apparatus from one of the plurality of clients who have been registered by the registering means; determining means for, in a case where the client, who is an issuer of the control request detected by the detecting means, does not possess the control privilege, determining whether or not shifting of the control privilege should be executed on the basis of a control-privilege possessing time of a client who currently has the control privilege; and updating means for updating contents of the waiting queue when the determining means determines to execute shifting of the control privilege.

Furthermore, an image server control method according to the present invention which attains the above objects is a control method of controlling an image server apparatus connectable with a plurality of clients via a network, and comprises the steps of: registering a plurality of clients, who have issued an obtain request to obtain a control privilege, in a waiting queue for obtaining the control privilege of an image sensing apparatus; detecting issuance of a control request of controlling the image sensing apparatus from one of the plurality of clients who have been registered in the registering step; in a case where the client, who is an issuer of the control request detected in the detecting step, does not possess the control privilege, determining whether or not shifting of the control privilege should be executed on the basis of a control-privilege possessing time of a client who currently has the control privilege; and updating contents of the waiting queue when determination is made in the determining step to execute shifting of the control privilege.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a table showing a data structure in a camera-control-priority table;

FIG. 12 shows a display example for inputting a password by a camera control client;

FIG. 13 shows a verification table of verifying users who request a camera control request;

DETAILED DESCRIPTION OF THE PREFERRED EMBODIMENTS

Preferred embodiments of the present invention will be described in detail in accordance with the accompanying drawings.

[First Embodiment]

Figure 1:
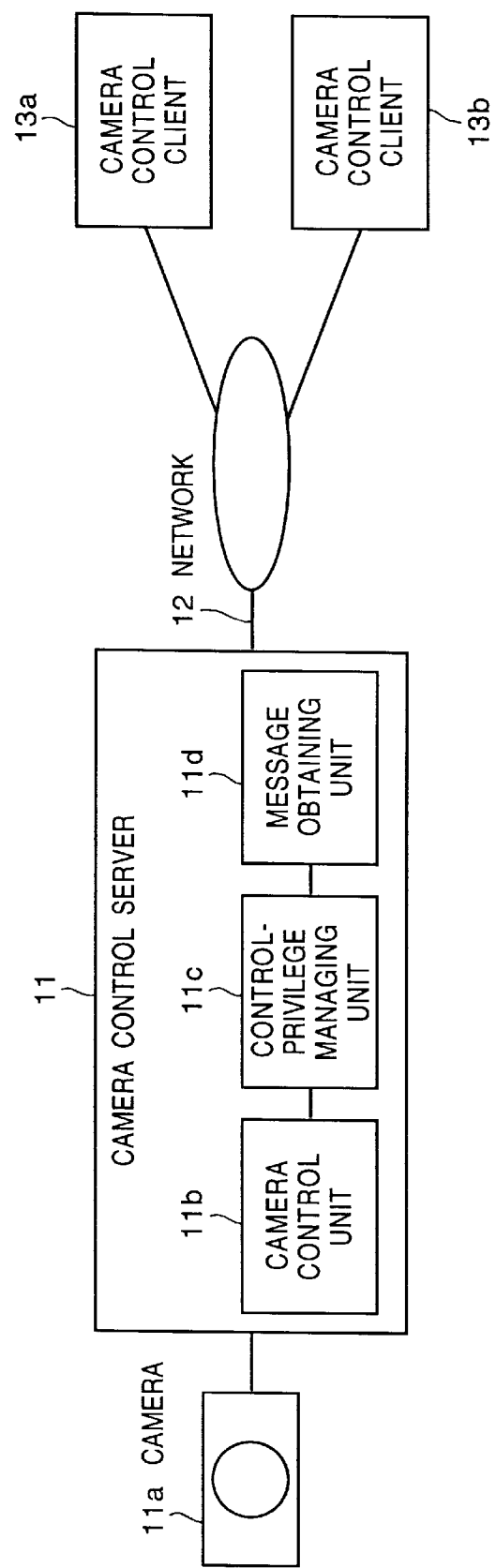
FIG. 1 is a block diagram showing a general arrangement of a camera control system according to the first embodiment.

FIG. 1 is a block diagram showing a general arrangement of a camera control system according to the first embodiment. Referring to FIG. 1, reference numeral 11 denotes a camera control server which performs camera control; 12, a network such as LAN, WAN, or Internet; and 13a and 13b, camera control clients which output a request to control a camera from remote locations.

Reference numeral 11a denotes a camera which senses an image, and where pan, tilt, zoom, image-sensing viewpoint and the like are controllable by instructions sent by an exterior unit. Reference numeral 11b denotes a camera control unit which controls the camera in accordance with the request sent by a remote user. Reference numeral 11c denotes a control-privilege managing unit which manages a control privilege of a camera in response to requests sent by a plurality of camera control clients. Reference numeral 11d denotes a message obtaining unit which obtains a message from the camera control clients 13a and 13b.

Figure 2:
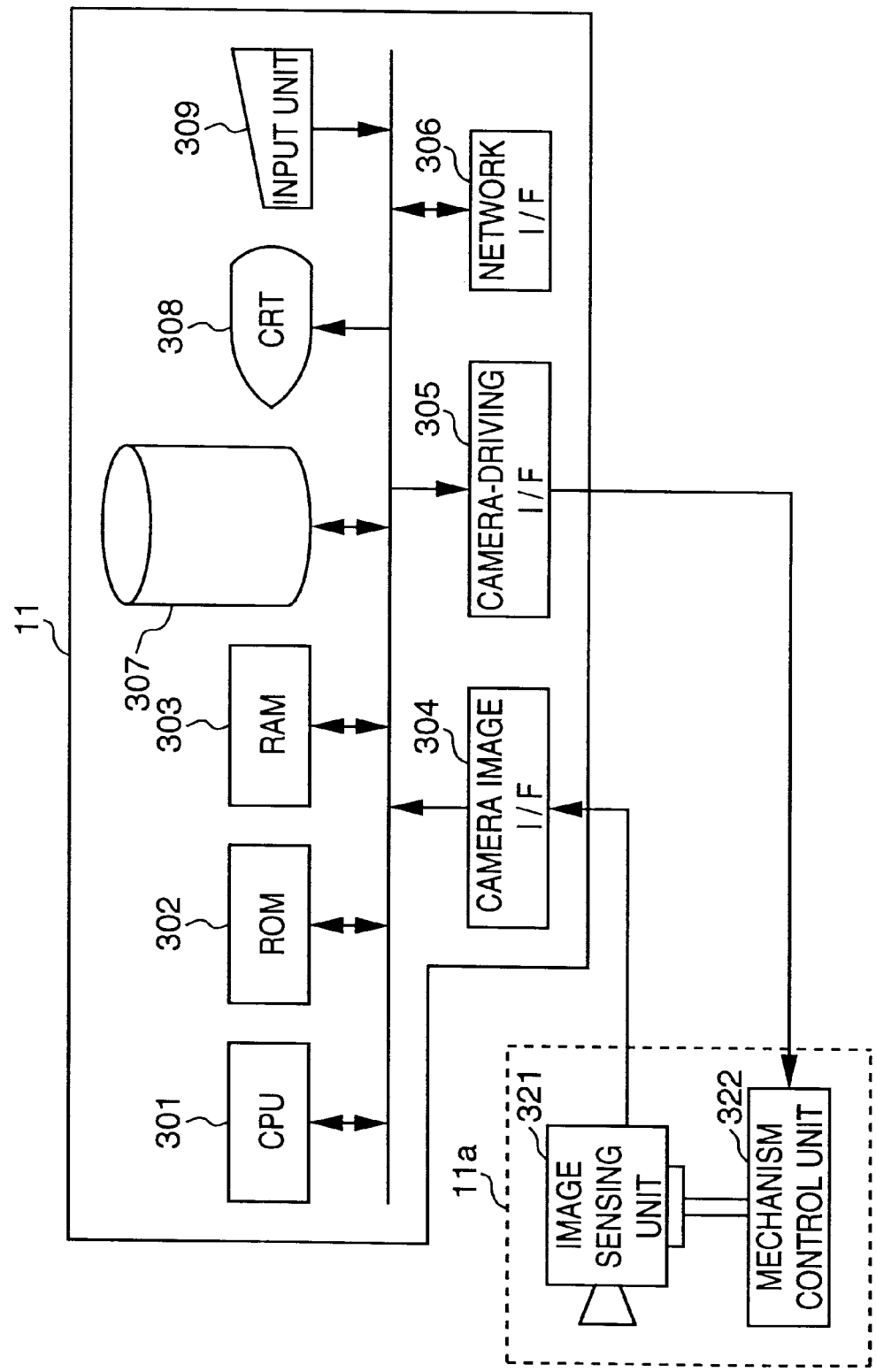
FIG. 2 is a block diagram showing an arrangement of a camera control server according to the present embodiment.

FIG. 2 is a block diagram showing an arrangement of a camera control server 11 according to the present embodiment. In FIG. 2, reference numeral 301 is a CPU, which performs various control in the camera control server; 302, a ROM which stores various control programs executed by the CPU 301; 303, a RAM which provides the CPU 301 with a work area necessary to execute the various control; 304, a camera-image interface which receives an image signal from the camera 11a; and 305, a camera-driving interface which controls pan, tilt zoom or the like of the camera 11a.

Reference numeral 306 in FIG. 2 denotes a network interface connected to the network 12, which realizes communication with other apparatuses (camera control clients 13a and 13b) on the network 12; 307, an external memory device which is constituted by e.g. hard disc or the like; 308, a CRT which performs various displaying by the control of the CPU 301; 309, an input unit such as a keyboard or the like for performing various input to the CPU 301; and 310, a bus for connecting the above-described components.

In the above-described configuration, the CPU 301 may load control programs stored in the external memory device 307 into the RAM 303 and execute the loaded control programs. Furthermore, the external memory device 307, CRT 308 and the input unit 309 are optional and may be omitted if not necessary. The camera control unit 11b, control-privilege managing unit 11c and message obtaining unit 11d shown in FIG. 1 indicate the functions realized by the CPU 301 which executes the control programs stored in the ROM 302 or the control programs loaded on the RAM 303.

In addition, the camera 11a includes: an image sensing unit 321 which outputs an image signal obtained by image sensing operation to the camera-image interface 304, and a mechanism control unit 322 which performs pan, tilt and zooming or the like of the image sensing unit 321 in accordance with a control signal inputted via the camera-driving interface 305.

In the camera control system of the present invention having the above-described arrangement, the camera control server 11 manages control requests of controlling the camera 11a which are sent by plural camera control clients, and controls grant of a control privilege to each client. Hereinafter, operation of the camera control system according to the first embodiment will be described.

Figure 3:
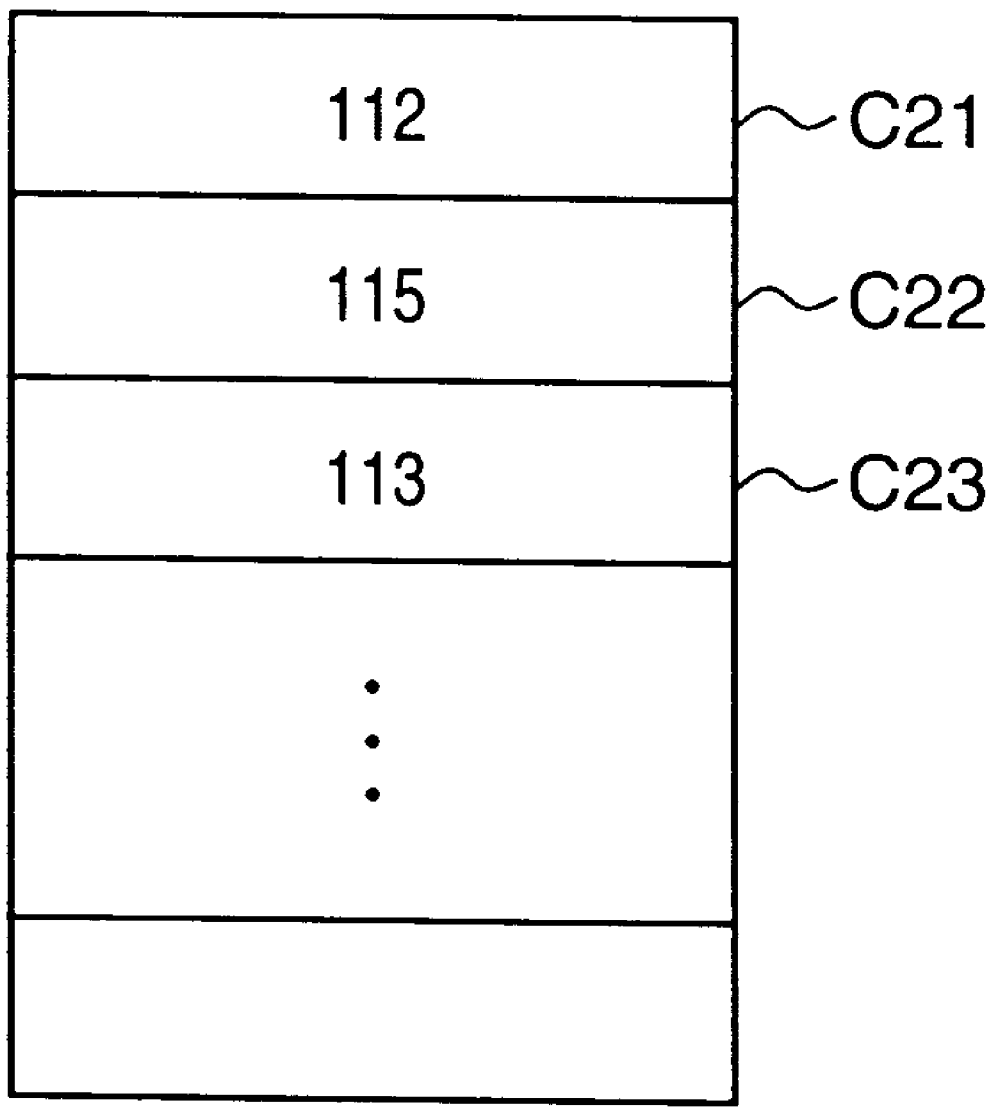
FIG. 3 is a structural view of a camera control queue according to the first embodiment.

The control-privilege managing unit 11c has a camera control queue to manage grant of the camera control privilege to each client. FIG. 3 shows a structure of the camera control queue according to the first embodiment. The camera control queue is stored in the RAM 303, and an ID of a client who requests camera control is registered. C21 (ID=112) in FIG. 3, which is the top of the queue, currently has the camera control privilege. C22 (ID=115) denotes a client's ID who will have the camera control privilege next to C21, and C23 (ID=113) denotes a client's ID who will then have the camera control privilege next to C22. Messages sent by the camera control clients 13a and 13b located in a remote location (hereinafter referred simply as a "client") include three types of messages: a camera-control-privilege obtain request, a camera control request and a camera-control-privilege abandon notification.

Figure 4A:
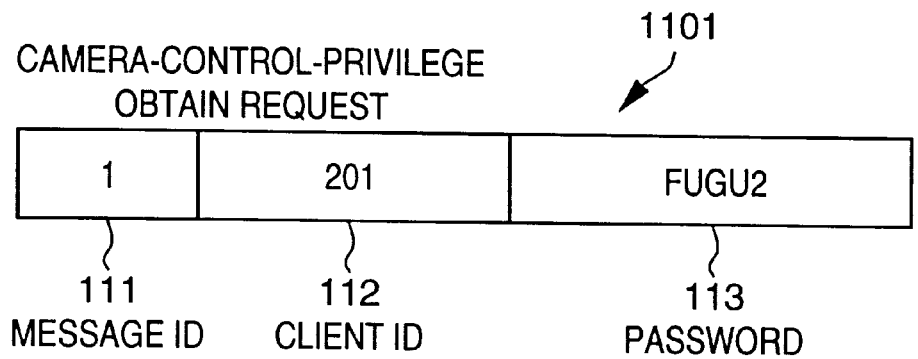
FIGS. 4A–4C are an explanatory view of a structure of a message sent to a camera control server by a camera control client.
Figure 4B:
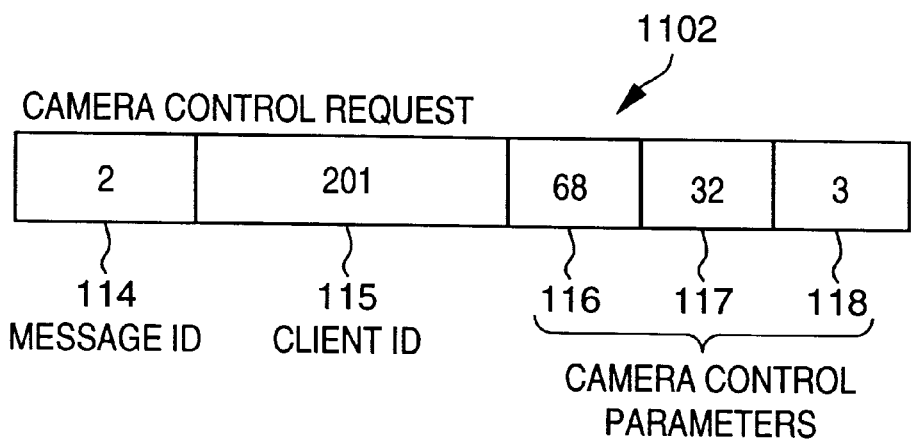
Figure 4C:
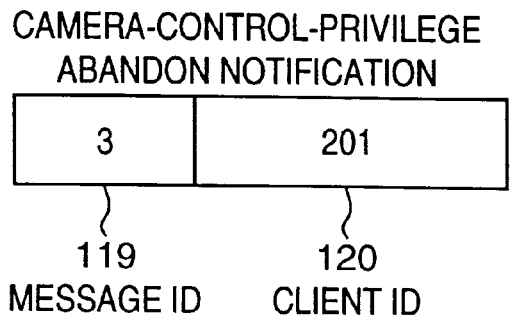

FIGS. 4A–4C are an explanatory view of a structure of a message sent to a camera control server by a camera control client. FIG. 4A shows a structure of a camera-control-privilege obtain request; FIG. 4B, a structure of a camera control request; and FIG. 4C, a structure of a camera-control-privilege abandon notification. Each message includes a message ID indicative of the type of the message, and a client ID indicative of the client who has issued the message. Hereinafter, the structure of each message will be explained.

A camera-control-privilege obtain request 1101 has "1" in a message ID 111, and consists of the message ID 111, a client ID 112 and a password 113. Note that since the password 113 is not used in the first embodiment (will be used in the fifth embodiment), it may be omitted. A camera control request 1102 has "2" in a message ID 114, and consists of the message ID 114 and camera-control parameter values including: a client ID 115, a pan angle 116, a tilt angle 117 and a zoom value 118. A camera-control-privilege abandon notification 1103 has "3" in a message ID 119, and consists of the message ID 119 and a client ID 120.

When the client wants to control the camera 11a, the client sends the camera-control-privilege obtain request to the camera control server 11 via the network 12. The client then sends a camera control request including values for pan, tilt, zoom. When the client gives up acquiring of the camera control privilege, or abandons the acquired camera control privilege, the client sends the camera-control-privilege abandon notification.

Figure 5:
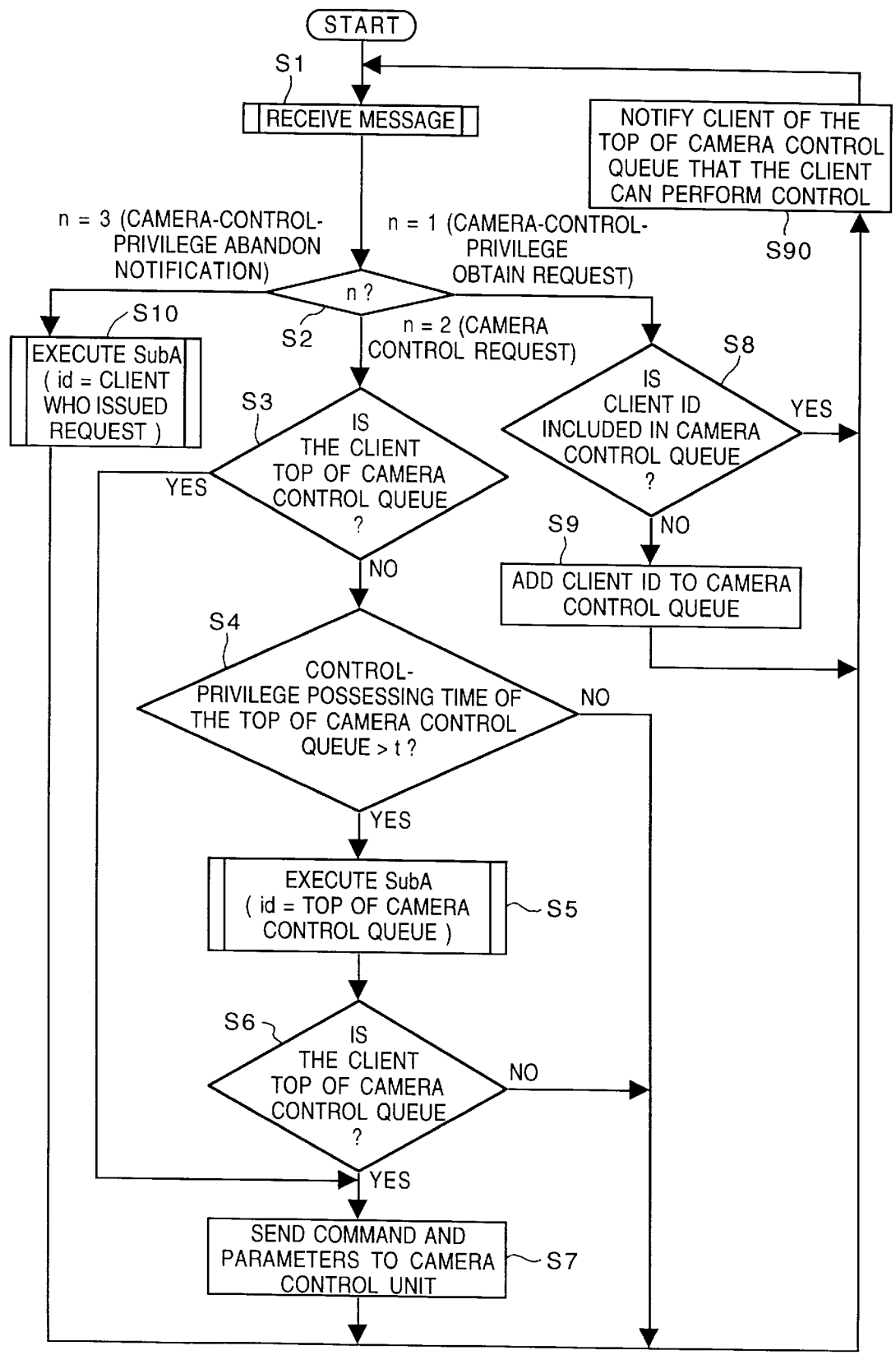
FIG. 5 is a flowchart showing controlling step of a camera control server according to the first embodiment.

FIG. 5 is a flowchart showing controlling step of the camera control server according to the first embodiment.

The flowchart shows the process performed by the camera control server 11 when a message is received by the camera control server 11.

When the message obtaining unit 11d receives a message (step S1), the message is transferred to the control-privilege managing unit 11c. The control-privilege managing unit 11c determines the type of the message based on the message ID included in the message (step S2). If the message is a camera-control-privilege obtain request (message ID="1"), the control-privilege managing unit 11c determines whether or not the client ID is included in the camera control queue (step S8); and if it is not included, the client ID is added to the camera control queue (step S9).

If the message is a camera control request (message ID="2"), the control-privilege managing unit 11c determines whether or not the client who has sent the request is the top of the camera control queue (step S3). If the client is the top of the camera control queue, the client can perform camera control; thus, a camera control command and parameters are generated on the basis of the parameters included in the camera control request and sent to the camera control unit 11b (step S7). Meanwhile, if the client is not at the top of the camera control queue, the control-privilege managing unit 11c determines whether or not a control-privilege possessing time of the current top of the camera control queue exceeds a predetermined time period t (step S4).

Herein, if the control-privilege possessing time of the current top of the camera control queue is less than the predetermined time period t, the above processing is terminated to allow the current top continuously keep the control privilege. In other words, the camera control request received in step S1 is discarded.

Figure 6:
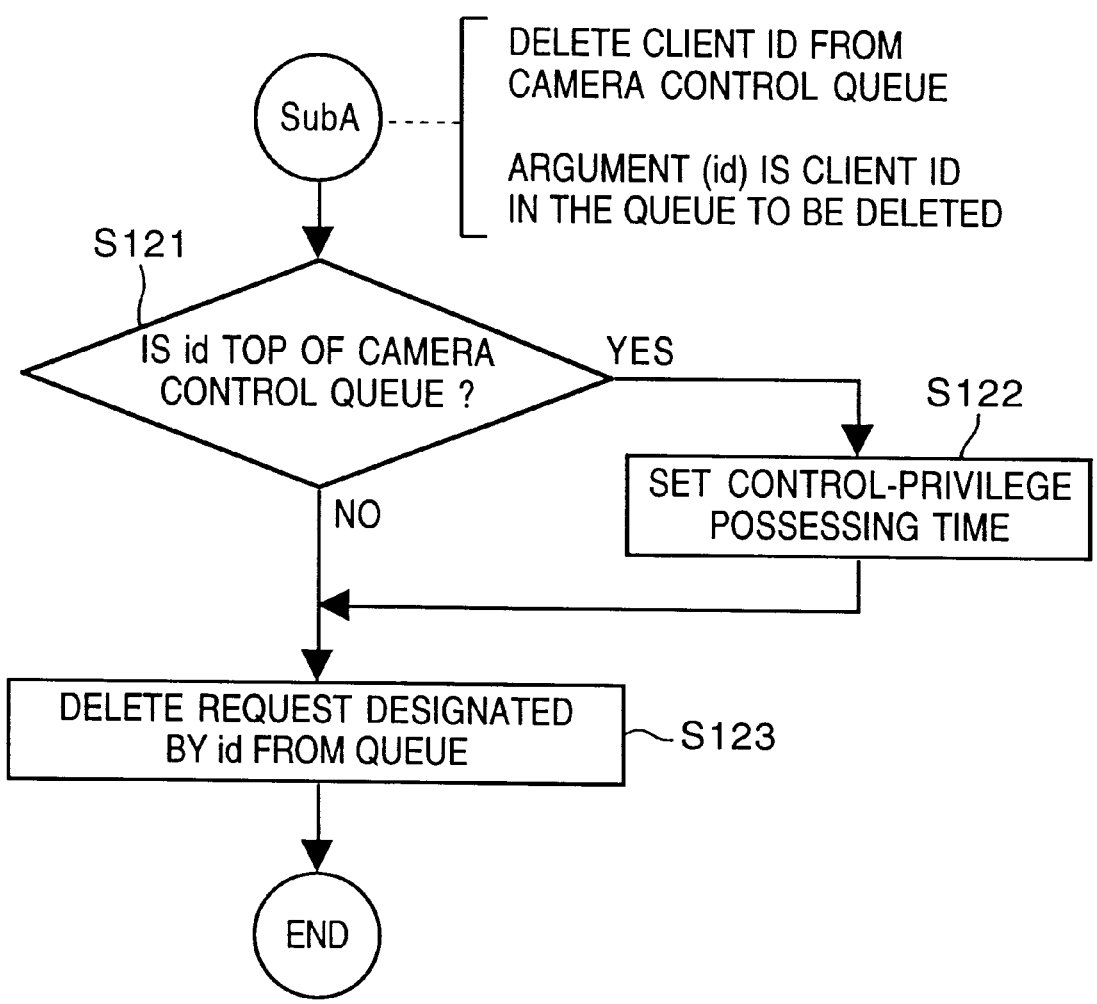
FIG. 6 is a flowchart showing control steps in a subroutine SubA.

Meanwhile, if the control-privilege possessing time of the current top of the camera control queue is larger than the predetermined time period t, the top of the camera control queue is substituted for an argument id and the sub routine SubA is executed (step S5). FIG. 6 is a flowchart showing control steps in a sub-routine SubA. First, it is determined whether or not the argument id is the top of the camera control queue (step S121). Since the top of the camera control queue has been substituted for an argument id in step S5, the processing proceeds to step S122. In step S122, the control-privilege possessing time is set again to time a control-privilege possessing time of the next client who will have the control privilege. Then, the request in the camera control queue designated by the argument id is deleted from the camera control queue (step S123). In this case, the top of the queue (C21 in FIG. 3) is deleted from the camera control queue.

To set the control-privilege possessing time in step S122, a control start time of the client who will newly become the top of the camera control queue may be set, or a control completion time of the client may be set. Alternatively, a time period t, indicative of the period one client can keep the control privilege, may be set at a counter or a timer or the like. In a case where a control start time is set, in step S4 (FIG. 5), the control-privilege managing unit 11c compares the time period t with the difference between the current time and the control start time. In a case where a control completion time is set, the control-privilege managing unit 11c determines in step S4 (FIG. 5), whether or not the current time has passed the control completion time. In a case where the time period t is set at a counter or a timer or the like, the control-privilege managing unit 11c checks in step S4 (FIG. 5), a counted time of the counter or checks whether time is up in the timer.

As set forth above, the control privilege is transferred to the next of the camera control queue (C22 in FIG. 3) by providing the top request in the control command queue for argument id and executing the sub routine SubA. As a result, the control-privilege possessing time of the top of the control command queue is timed.

When the sub routine SubA is completed, the top of the camera control queue is updated. As a result, a client who has issued a camera control request may become the top of the camera control queue. For this, it is determined again in step S6 if the client who has issued the camera control request is now at the top of the camera control queue (step S6). If so, a camera control command and parameters are generated on the basis of parameters included in the camera control request and sent to the camera control unit 11b (step S7). The camera control unit 11b which receives the camera control command and parameters sends an instruction based on a specification of the camera 11a to the camera 11a (the mechanism control unit 322) via the camera-driving interface 305 in order to actually control the camera 11a. Upon receiving the instruction, the camera 11a executes tilting, panning and zooming or the like based on the instruction and changes the view point of image sensing operation.

If the message received in step S2 is a camera-control-privilege abandon notification, the aforementioned sub routine SubA is executed. However, in this case, the ID of the client who has sent the message is provided as the argument id and the sub routine is executed (step S10). In the sub routine SubA, if the argument id is the top of the camera control queue, the control-privilege possessing time is set again (step S122) to time the control-privilege possessing time of the next client who will next have the control privilege, and the ID is deleted from the camera control queue (step S123). Meanwhile, if the ID designated by the argument id is not the top of the camera control queue, the ID is simply deleted from the camera control queue (step S123). As described above, in response to the camera-control-privilege abandon notification message, a corresponding ID is deleted from the camera control queue.

Upon completion of the foregoing steps S7, S9 and S10 in FIG. 5, or upon returning step S1 from the processing branching off to "NO" after step S4 or S6, processing in step S90 is executed. In step S90, the client who is the top of the camera control queue is notified that the client can now perform control operation. By this processing, when the client can perform control (when the client acquires the control privilege), a notification is sent to the client.

Figure 7:
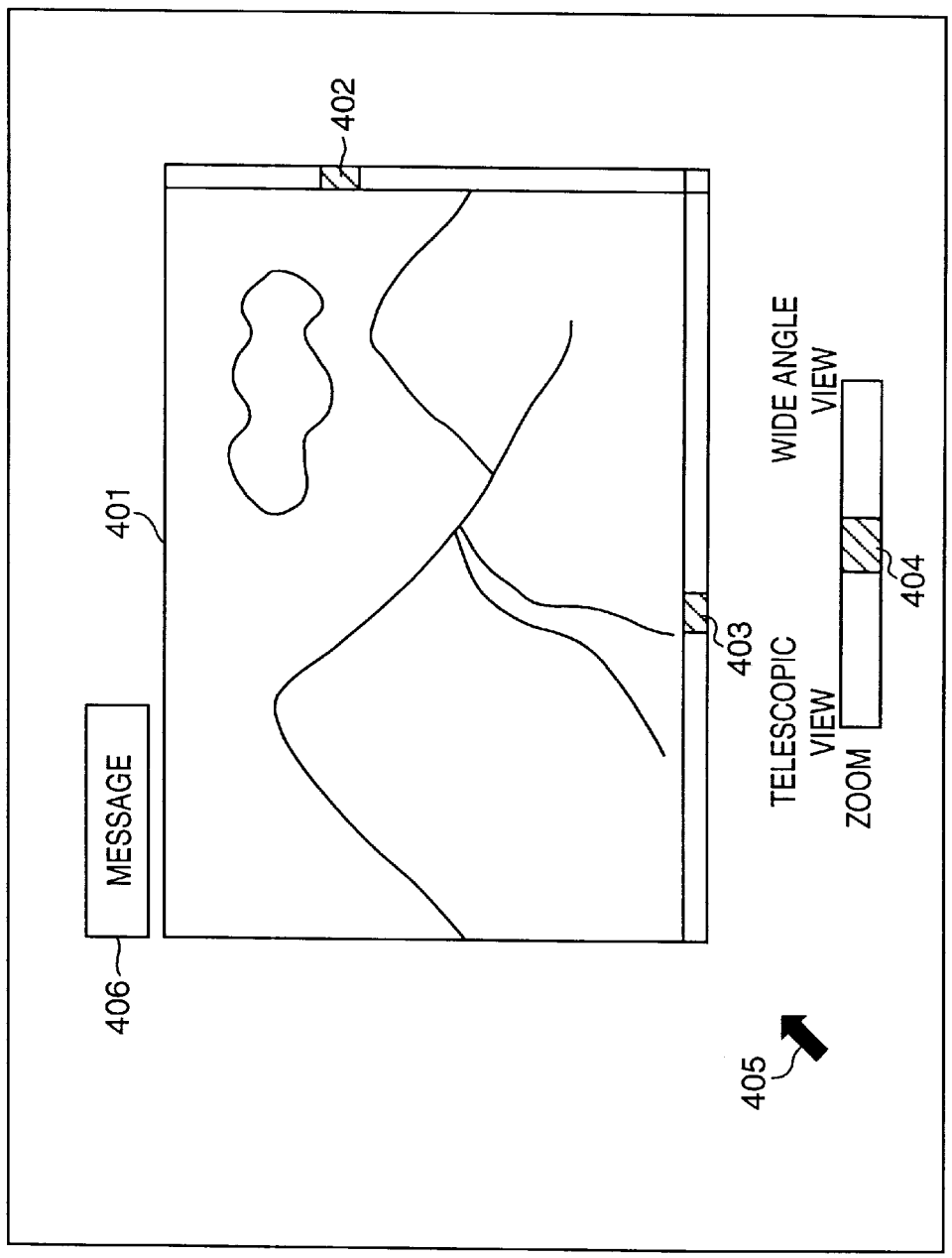
FIG. 7 shows a display of a camera control client according to the first embodiment.

The notification is displayed in a message display window 406 which is a display screen of the camera control client, which will be described later with reference to FIG. 7. Accordingly, a user is able to easily determine whether or not the user currently has the control privilege.

It is preferable to perform the notifying process in step S90, before returning to step S1 and after completing step S5 or step S10 in FIG. 5. This is because a client who has the camera control privilege may change as a result of executing the routine SubA in steps S5 and S10. Alternatively, it may be configured such that the processing in step S90 is executed periodically in a routine different from the processing in FIG. 5.

Next, a user interface of the camera control client will be described. FIG. 7 shows a display of a camera control client according to the first embodiment. In FIG. 7, reference numeral 401 denotes an image display window where an image is displayed on the basis of image data sent by the camera 11a. Reference numeral 402 denotes a scroll bar for tilt instruction. By vertically moving the scroll bar 402 with operation of a mouse cursor 405, a camera control request message is issued, instructing the camera 11a to perform tilt operation. Reference numeral 403 denotes a scroll bar for pan instruction and the usage thereof is similar to that of the scroll bar 402. In addition, reference numeral 404 denotes a scroll bar for instructing the camera 11a to perform zoom operation. By operating the scroll bar 404 with the mouse cursor 405, the camera 11a is controlled to have a telescopic view (zoom-in) or a wide-angle view (zoom-out). Reference numeral 406 denotes a message display window.

Although not shown in FIGS. 5 and 6, in a case where the control request message is turned down as a result of the determination performed in step S4 or step S6, a message notifying the determination can be sent to the issuer of the message, and the message can be displayed in the message display window 406. For instance, assuming that the scroll bar 403 is operated, a camera control request message which corresponds to the operation is issued. If the request is turned down by the camera control server 11, a message notifying the message being turned down is displayed in the message window 406. Note that such control can be realized by adding a step of "sending a message to the client who is an issuer of the control request message to notify that the control request is turned down" after branching off to "No" in step S4 and step S6 in FIG. 5.

Moreover, by having the configuration to notify a camera control client that the client has acquired the camera control privilege, it is also possible to display in the message window 406 whether or not a camera of interest is currently controllable. This is realized by, for instance, adding a step of "sending a message to the client who is an issuer of the control request message to notify that the control request is accepted" after branching off to "YES" in step S6 in FIG. 5. In a case a notification is received as a result of the processing in step S90 as described above, a message "control privilege already granted" is displayed in the message display window 406.

Note that according to the foregoing embodiment, a camera-control-privilege obtain request is issued by an apparatus as a camera control client (hereinafter referred to as a client apparatus) at the time of accessing the camera control server for the purpose of displaying an image on the image display window 401. More specifically, at this stage, the processing in steps S8 and S9 are executed by the camera control server 11 and the client ID is registered in the camera control queue. In other words, in step S1, the camera control server 11 does not receive a camera control request or a camera-control-privilege abandon notification from apparatuses which are not registered in the camera control queue.

As has been described above, according to the first embodiment, the camera control privilege is smoothly transferred among a plurality of clients by virtue of the time limit which limits the time period during which one client can keep the camera control privilege. Accordingly, a plurality of users can fairly control the camera 11c.

In addition, according to the foregoing controlling steps, as long as no control request is sent by other clients, the client who currently possesses the control privilege can continuously keep the privilege even after the predetermined time period t has passed. In other words, the camera control privilege is granted in correspondence with a volume of traffic of control requests issued by clients.

[Second Embodiment]

According to the first embodiment, in the case of sending a camera control request, if the client who has sent the camera control request is not the top of the camera control queue, the control request is simply turned down (steps S3 and S6 in FIG. 5). However according to the second embodiment, in the case where the camera control request is turned down, the waiting time for which the client must wait to acquire the camera control privilege is calculated, and the waiting time is notified to the client. Note that each apparatus and arrangement of each unit in the camera system according to the second embodiment is identical to those in the first embodiment (FIGS. 1–4); thus, description thereof will be omitted.

Figure 8:
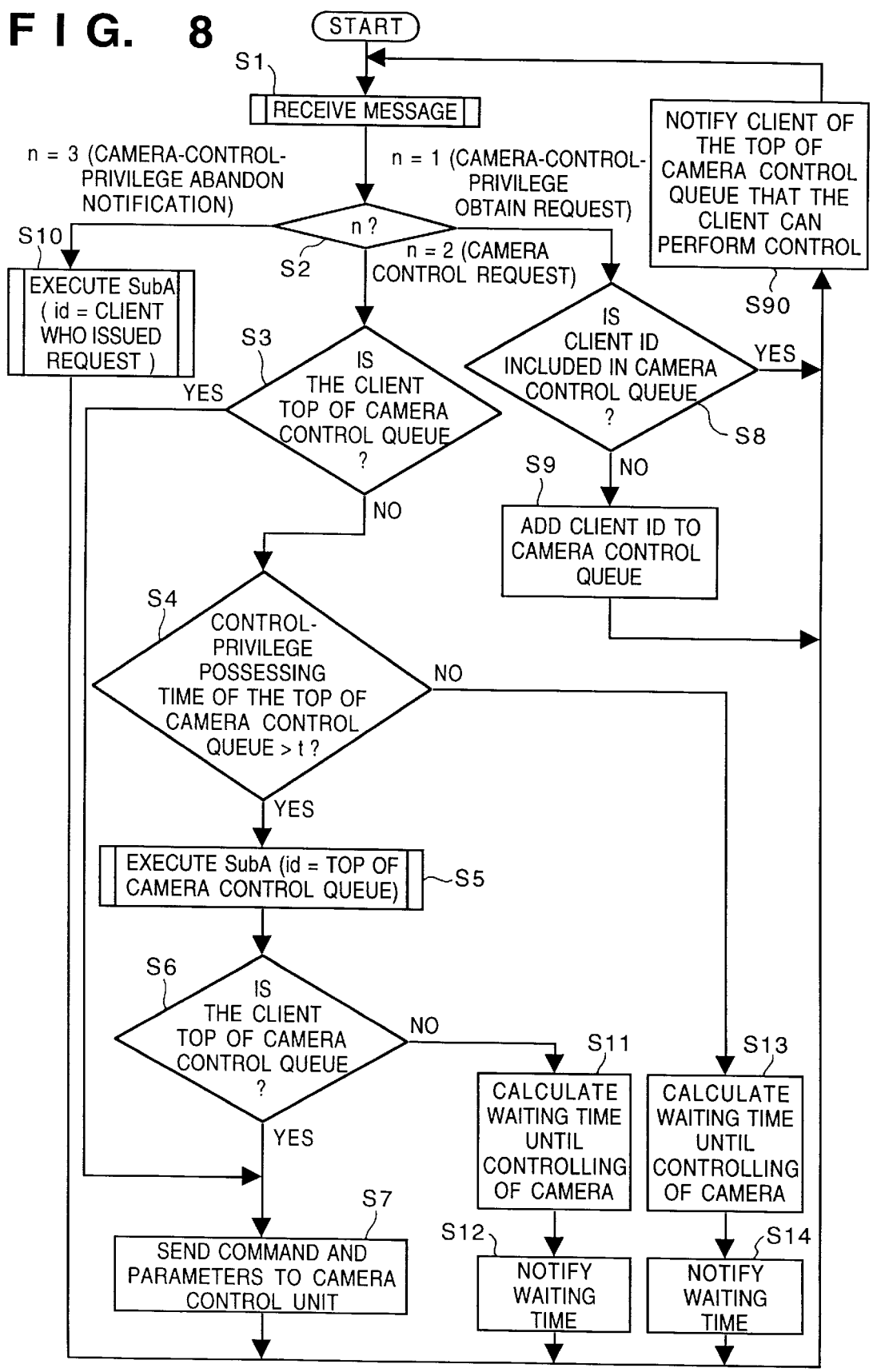
FIG. 8 is a flowchart showing process steps executed by a camera control server 11 according to the second embodiment.

FIG. 8 is a flowchart showing process steps executed by the camera control server 11 according to the second embodiment. The processing in steps S1 to S10 in FIG. 8 are identical to the processing in steps S1 to S10 in FIG. 6.

When a client who has sent a camera control request is not the top of the camera control queue (step S3), and when the control-privilege possessing time of the current top of the camera control queue is less than the predetermined time period t (step S4), an approximate waiting time for the client who has sent the camera control request is calculated (step S13). Assume that, in the following equation (1), the reference letter M denotes the present control-privilege possessing time of the top of the camera control queue, and N denotes the number of entry clients in the camera control queue existing before the client who has sent the control request and after the second in the queue. The waiting time T obtained in step S13 is calculated by the following equation (1):

Camera Control Waiting Time $T=(t-M)+N\times t$ (1)

In step S14, the camera control waiting time T obtained by equation (1) is notified to the client who has issued the camera control request.

Upon shifting the control privilege in step S5, the client who has sent the camera control request determines whether or not the client is now the top of the camera control queue (step S6). As a result, if the client is not yet the top of the camera control queue, the waiting time is calculated in the following method (step S11). Assume that the reference letter P denotes the number of entry clients in the camera control queue existing before the client who has sent the camera control request.

Waiting Time $T=P\times t$ (2)

The waiting time T calculated as above is notified to the client who has sent the camera control request (step S12).

Note that the camera control waiting time calculated by the foregoing manner is displayed in a display unit of the camera control client. For instance, in a case of utilizing the display form shown in FIG. 7, the camera control waiting time T is displayed in the message display window 406 to inform of the approximate waiting time for which the client must wait to acquire the camera control privilege.

As set forth above, according to the second embodiment, even in the case where the client who has sent a camera control request cannot acquire a camera control privilege, a client is able to learn an approximate waiting time for which the client must wait to acquire the camera control privilege. By virtue of this, a user of the client can determine, depending on the waiting time, whether to wait for acquiring the control privilege or to give up obtaining the privilege. Accordingly, operability is improved.

Moreover, as similar to the first embodiment, since the processes shown in FIG. 8 are executed in response to a control request, the client who currently possesses the control privilege can continuously keep the privilege unless another control request is sent by other clients. In other words, the camera control privilege is granted in correspondence with a volume of traffic of control requests issued by clients.

[Third Embodiment]

In the first embodiment, a client (a client registered in the camera control queue), who has acquired the camera control privilege by sending a camera-control-privilege obtain request, keeps the camera control privilege for a predetermined period of time. In other words, the camera control privilege is granted to the client who is registered in the camera control queue for a predetermined period of time even if the client does not actually send a camera control request; thus, camera control requests from other clients are turned down.

According to the third embodiment, the camera control server stores time at which the client, who has the camera control privilege, has last sent a camera control request, in a memory. The camera control server then determines whether or not a camera control request has not been issued for more than a predetermined period of time. If a camera control request has not been issued for more than a predetermined period of time, it is decided that the client who currently has the camera control privilege will no longer issue a camera control request, and shifting of the camera control privilege is performed.

Figure 9:
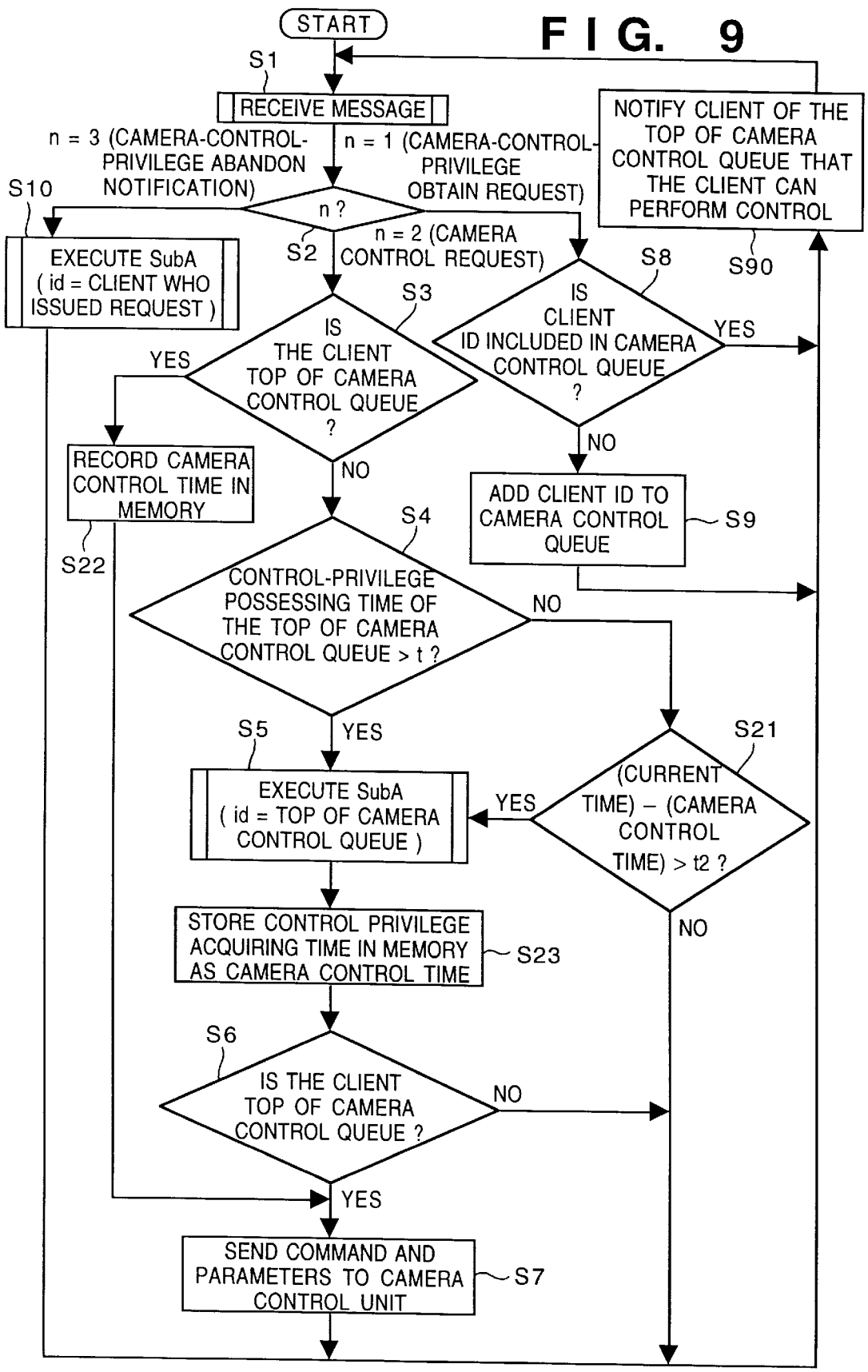
FIG. 9 is a flowchart showing process steps executed by a camera control server according to the third embodiment.

FIG. 9 is a flowchart showing process steps executed by the camera control server according to the third embodiment. Note that the structure of the camera control system in the third embodiment is identical to that of the first embodiment; thus description thereof will be omitted. In FIG. 9, those processing steps which execute the identical processing to the steps in FIG. 5 are referred to by the same reference step numerals.

In a case where the client who has issued the camera control request is the top of the camera control queue (in a case where the client has the camera control privilege), the processing proceeds to step S22 where the current time is stored in the memory (RAM 303) as a camera control time.

Meanwhile, in a case where the client who has issued the camera control request is not the top of the camera control queue (step S3), and the control-privilege possessing time of the current top of the camera control queue is less than the predetermined time period t (step S4), the processing proceeds to step S21. In step S21, it is determined whether or not the difference between the current time and the camera control time, set at the above-described step S22 or step S23 to be described later, is larger than a predetermined time period t2. Note that the camera control time is the time at which the client, who is the top of the camera control queue, has last sent a camera control request. Herein, if the difference is larger than the predetermined time period t2, it is decided such that the client who currently possesses the camera control privilege will no longer issue a camera control request, and the camera control server starts the sub routine SubA to shift the camera control privilege (step S5).

Upon shifting the camera control privilege, the time of acquiring the control privilege is stored in the memory (RAM 303) as a camera control time (step S23).

According to the foregoing processing, when the camera control privilege is shifted, the time at which a client acquires the control privilege is stored in the memory provided to store camera control time. Each time the client sends a camera control request, the time at which the client sends the request, is written on top of the stored camera control time (steps S22, S23). When a control request is used by a client other than the client who currently possesses the control privilege, the camera control server determines how much time has passed since the client, currently having the control privilege, has last issued a camera control request (step S21); and on the basis of the time period, controlling is performed to shift the control privilege.

Thus, according to the third embodiment, a client, who does not issue a camera control request in spite of the possession of the control privilege, is deleted from the camera control queue before lapse of the predetermine time period t. Therefore, it is possible to efficiently provide the control privilege to clients who wish to perform camera control.

Moreover, as similar to the first embodiment, since the processes shown in FIG. 9 are executed in response to a control request, the client who currently possesses the control privilege can continuously keep the privilege unless another control request is sent by other clients. Therefore, the camera control privilege is granted in correspondence with a volume of traffic of control requests issued by clients.

[Fourth Embodiment]

In the first embodiment, a camera control privilege is fairly granted to all camera control clients. In the fourth embodiment, a camera-control-priority priority table is provided to the control-privilege managing unit 11c of the camera control server 11, to preferentially grant the camera control privilege to a client having a high priority. In addition, a camera-control-allowed time is stored in the camera-control-priority table so that different control-allowed time can be set for each client. Hereinafter, the fourth embodiment will be described. Note that the structure of the camera control system in the fourth embodiment is identical to that of the first embodiment (FIGS. 1–4); thus description thereof will be omitted.

FIG. 10 is a table showing a data structure in the camera-control-priority table. The camera-control-priority table is stored in the RAM 303. In the camera-control-priority table, a camera-control client ID 41, priority 42 indicative of a priority level set for each client, and a camera-control-allowed time 43 provided to each client, are registered. For instance, a client having a camera-control client ID 101 has a priority level 3, and 15 seconds for a control-allowed time. The priority is higher as the number is larger. For those clients who are not stored in the table, a default value is provided (in the present case, a priority level 1 and 10 seconds of a control-allowed time is provided).

Figure 11:
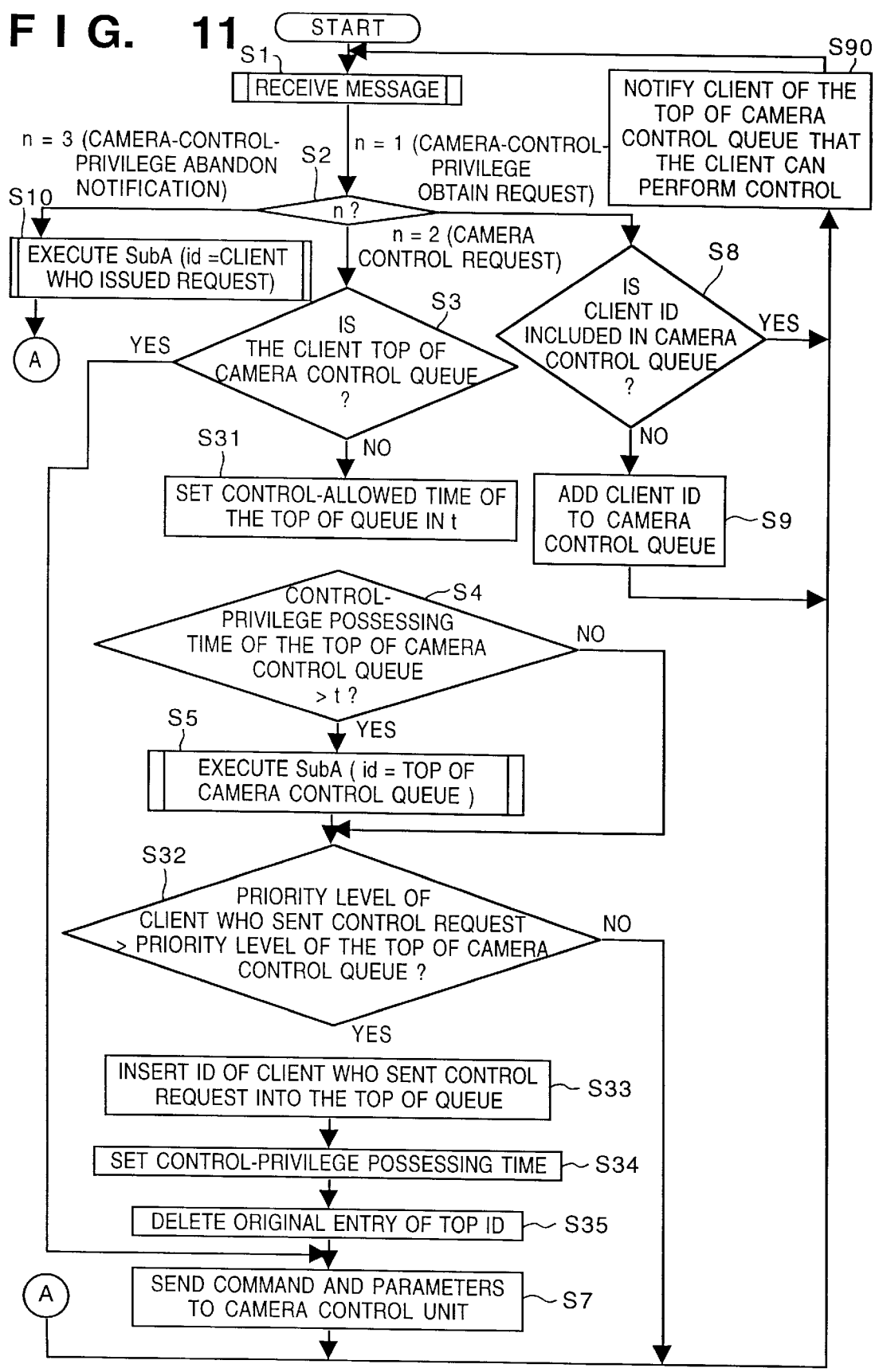
FIG. 11 is a flowchart showing operation of the camera control server 11 according to the fourth embodiment.

FIG. 11 is a flowchart showing operation of the camera control server 11 according to the fourth embodiment. In the fourth embodiment, when a client sends a message to the camera control server 11, the camera control server 11 operates as explained in FIG. 11. Note that in FIG. 11, those processing steps which execute the identical processing to the steps in FIG. 5 are referred to by the same reference step numerals.

As similar to the first embodiment, when the message obtaining unit 11d receives a message (step S1), the message is transferred to the control-privilege managing unit 11c. The control-privilege managing unit 11c determines the type of the message (step S2). If the message is a camera-control-privilege obtain request or a camera-control-privilege abandon notification, processes similar to those explained in the first embodiment are performed by the control-privilege managing unit.

If the received message is a camera control request, it is determined whether or not the client who has issued the request is the top of the camera control queue (step S3); and if it is the client of the top of the camera control queue, the client can perform camera control; thus, a camera control command and parameters are sent to the camera control unit 11b (step S7).

Meanwhile, if the client who has issued the control request is not the top of the camera control queue, the control-privilege managing unit 11c looks up, in the camera-control-priority table, the camera-control-allowed time of the client who currently has the control privilege, and inserts the camera-control-allowed time into "t" (step S31). Then it is determined whether or not the control-privilege possessing time of the client who currently possesses the control privilege exceeds the camera-control-allowed time period t (step S5). If it exceeds, the client's ID of the top of the camera control queue is provided to the argument id, and the sub routine SubA (see FIG. 6) explained in the first embodiment is executed. As a result, the top of the camera control queue is deleted and the control privilege is granted to the next in the camera control queue.

Upon updating the camera control queue in steps S31, S4 and S5 as necessary, the priority level of camera control for the client who has just issued the camera control request, and the priority level of camera control for the client who is the top of the camera control queue, are obtained from the camera-control-priority table, and the priority levels are compared (step S32). If the client who has just issued the camera control request has a lower priority level, the request is turned down and the processing returns to step S1.

Meanwhile, if the client who has just issued the camera control request has a higher priority level, the client's ID is inserted into the top of the camera control queue (step S33). By this operation, the top of the control queue is updated and shifting of the control privilege is executed. Then, the control-privilege possessing time is set to time the control-privilege possessing time of the client who has newly acquired the control privilege (step S34). Furthermore, the original entry of the client, who has been inserted to the top of the camera control queue, is deleted (step S35). According to the processing in steps S33 and S34, the ID of the client who has issued the camera control request is shifted to the top of the camera control queue. Then a camera control command and parameters are sent to the camera control unit 11b (step S7).

Then, similar to the first embodiment, the camera control unit 11b which receives the camera control command and parameters sends an instruction based on the specification of the camera 11a to the camera 11a in order to actually control the camera 11a. Upon receiving the instruction, the camera 11a changes the view point of image sensing operation based on the instruction.

As set forth above, according to the fourth embodiment, by virtue of the priority given to a camera control request sent from a remote location, it is possible to flexibly manage camera control requests, for instance, to preferentially grant the camera control privilege to a client requesting camera control who is important.

Moreover, as similar to the first embodiment, since the processes shown in FIG. 11 are executed in response to a control request, the client who currently possesses the control privilege can continuously keep the privilege unless another control request is sent by other clients. In other words, the camera control privilege is granted in correspondence with a volume of traffic of control requests issued by clients.

[Fifth Embodiment]

In the fifth embodiment, a client has the function to input a password, while the control-privilege managing unit 11c of the camera control server 11 has a verification table for verifying a user who sends a camera control request. If is to limit users, who perform camera control utilizing the camera control server 11, to specified users. Hereinafter, the fifth embodiment will be described. The structure of the camera control system in the fifth embodiment is identical to that of the first embodiment (FIGS. 1–4); thus description thereof will be omitted.

FIG. 12 shows a display example for inputting a password by a camera control client. When a user sends a camera-control-privilege obtain request via a graphical user interface or the like, a password input panel 81 shown in FIG. 12 is displayed. When a user inputs a client ID in a box 82 and a password in a box 83, and clicks on an OK button 84, the camera-control-privilege obtain request as shown in FIG. 4A is issued. More specifically, the camera-control-privilege obtain request according to the fifth embodiment includes, as shown in FIG. 4A, the message ID 111 indicative of a type of a message, client ID 112 and password 113. In this case, the client ID 112 has the data inputted in the box 82; and the password 113 has the data inputted in the box 83.

FIG. 13 shows a verification table of verifying users who request a camera control request. It is assumed that the verification table is stored in the RAM 303. Note that when the power of the camera control server 11 is turned off, the table is saved in the external memory device 307 such as hard disc or the like, and is loaded again in the RAM 303 next time the power is turned on. In other words, the verification table is stored in a non-volatile memory. Furthermore, generation and registration of the verification table is executed via the input unit 309 of the camera control server 11. In the aforementioned verification table, a client ID 91 and a password 92 (FIG. 13) are stored with one-to-one correlation.

Figure 14:
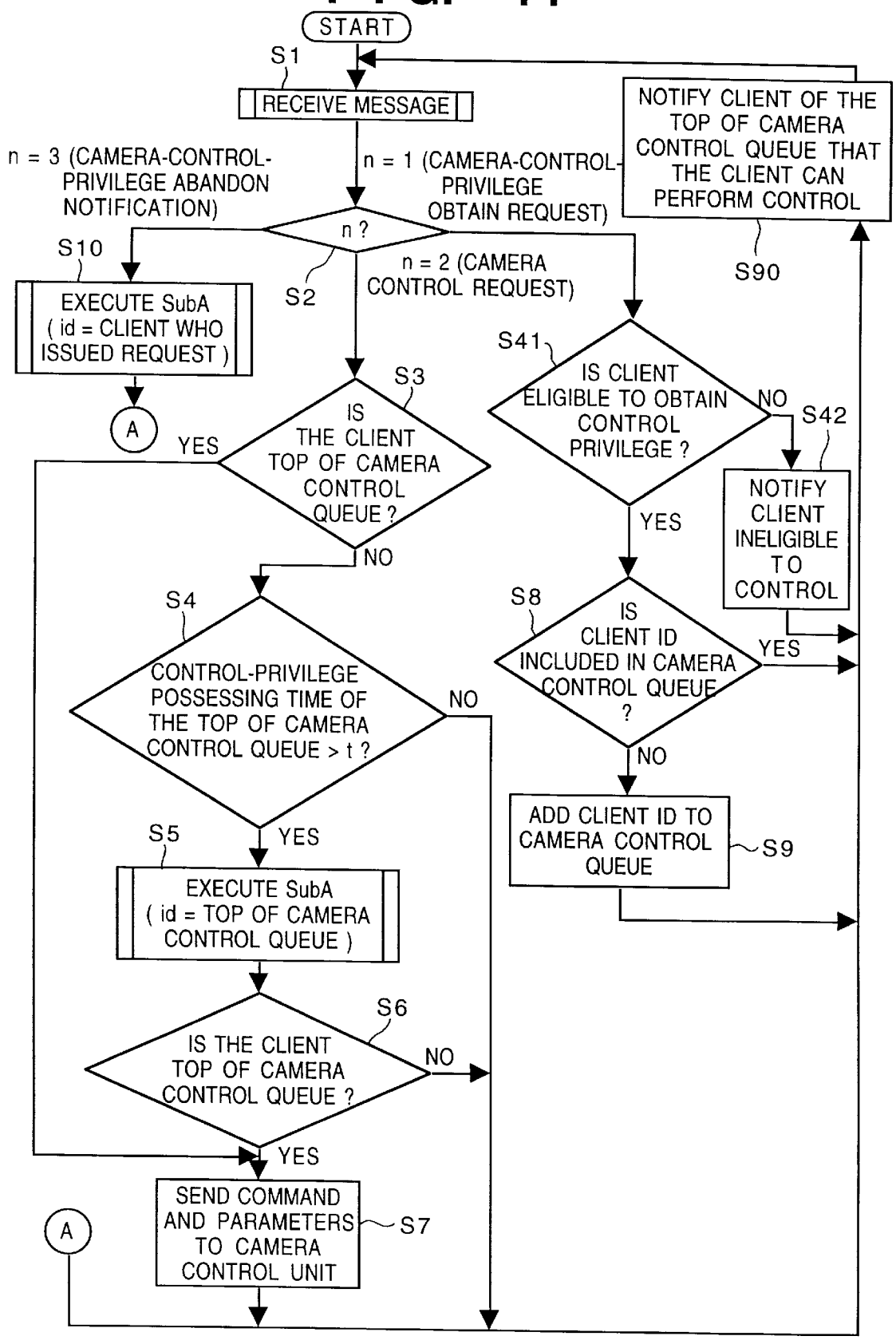
FIG. 14 is a flowchart showing operation of the camera control server according to the fifth embodiment.

FIG. 14 is a flowchart showing operation of the camera control server according to the fifth embodiment. When a message is sent by a client, the camera control server according to the fifth embodiment operates as shown in the flowchart in FIG. 14. Note that in FIG. 14, those processing steps which execute the identical processing to the steps in FIG. 5 are referred to by the same reference step numerals.

When the message obtaining unit 11d receives a message (step S1), the message is transferred to the control-privilege managing unit 11c. The control-privilege managing unit 11c determines the type of the message based on the message ID (step S2). If the message is a camera control request or a camera-control-privilege abandon notification, processing similar to those in the first embodiment are respectively performed.

Meanwhile, if the received message is a camera-control-privilege obtain request, the control-privilege managing unit 11c searches for the transmitted client ID (112 in FIG. 4A) in the client ID 91 in the verification table, and checks the transmitted password (113 in FIG. 4A) with the password 92 in the verification table, to determine whether or not the client is eligible to obtain the control privilege (step S41). To clients whose ID is not registered at the verification table or whose password is inputted wrong, a notification is sent to inform that the client is not eligible to obtain the control privilege and that the client cannot perform camera control (step S42). The client who receives the notification displays the message, e.g., in the message window 406 in FIG. 7.

If the client is eligible to obtain the control privilege (who is registered at the verification table and whose password is input correctly), the control-privilege managing unit 11c determines whether or not the client ID is included in the camera control queue (step S8); and if it is not included, the client ID is added to the camera control queue (step S9).

In the fifth embodiment, verification is performed with respect to a camera-control-privilege obtain request. By applying the similar verification method to image transmission, it is possible to transmit an image only to a designated client.

As has been described above, verification means is provided to the fifth embodiment to verify a user (client) who sends a control request to control an image input apparatus. Accordingly, it is possible to limit users who control the image input apparatus to specified users. On account of this, demands or needs for allowing only the specified users to control a valuable image or the like, can be satisfied.

Moreover, as similar to the first embodiment, since the processes shown in FIG. 11 are executed in response to a control request, the client who currently possesses the control privilege can continuously keep the privilege unless another control request is sent by other clients. In other words, the camera control privilege is granted in correspondence with a volume of traffic of control requests issued by clients.

[Sixth Embodiment]

In the fourth embodiment, description has been provided on granting a control-privilege in accordance with a priority level. However, in the fourth embodiment, if a number of clients having high priority levels are registered in the waiting queue one after another, a client having a low priority level must wait for a long time to obtain the control privilege. To cope with such problem in the sixth embodiment, description will be provided on a control method taking account of the priority level and a period of waiting time since a client is registered in the waiting queue.

Figures 15, 16:
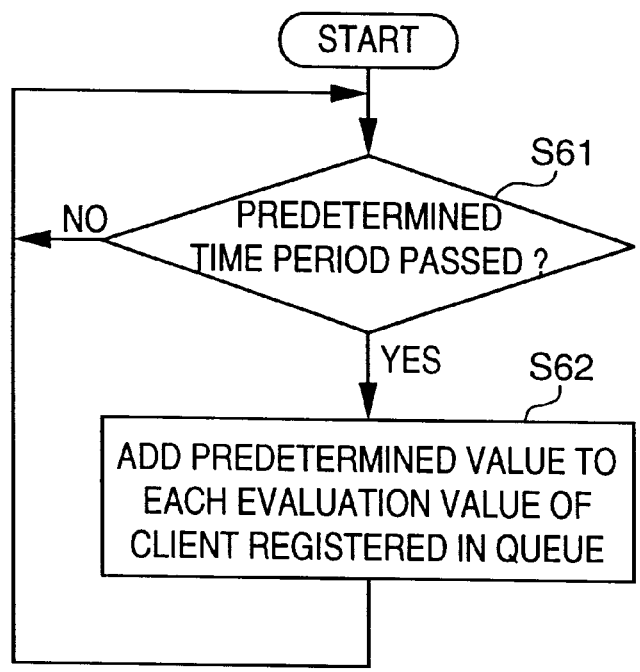
FIG. 15 is a table showing a camera control queue according to the sixth embodiment.
FIG. 16 is a flowchart showing the process of updating an evaluation value, which is performed at an interval of a predetermined time period.

FIG. 15 is a table showing a camera control queue according to the sixth embodiment. FIG. 16 is a flowchart showing the process of updating an evaluation value, which is performed at an interval of a predetermined time period.

As shown in FIG. 15, a client ID 1501 and an evaluation value 1502 are registered in the camera control queue. For the evaluation value 1502, the priority level of each client is set as an initial value. By the processes shown in FIG. 16, the evaluation value 1502 is increased in accordance with the lapse of time registered in the camera control queue. More specifically, as a predetermined time period passes (step S61), a predetermined value is added to the evaluation value of each client registered in the camera control queue (step S62). As a result, the longer the time registered in the camera control queue, the larger the evaluation value a client will have.

Figure 17A:
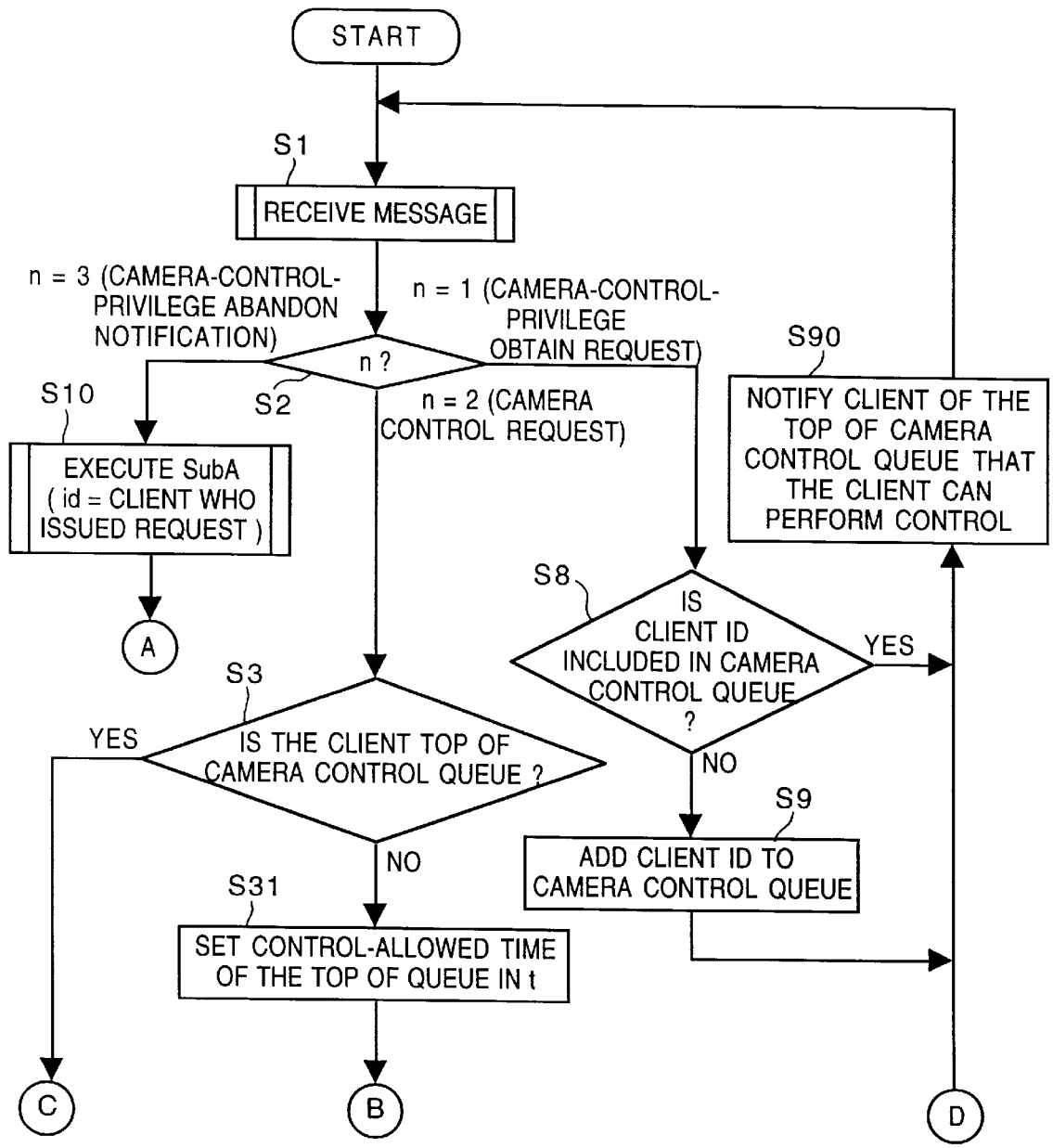
FIG. 17A and FIG. 17B are flowcharts showing control steps of the camera control server according to the sixth embodiment.
Figure 17B:
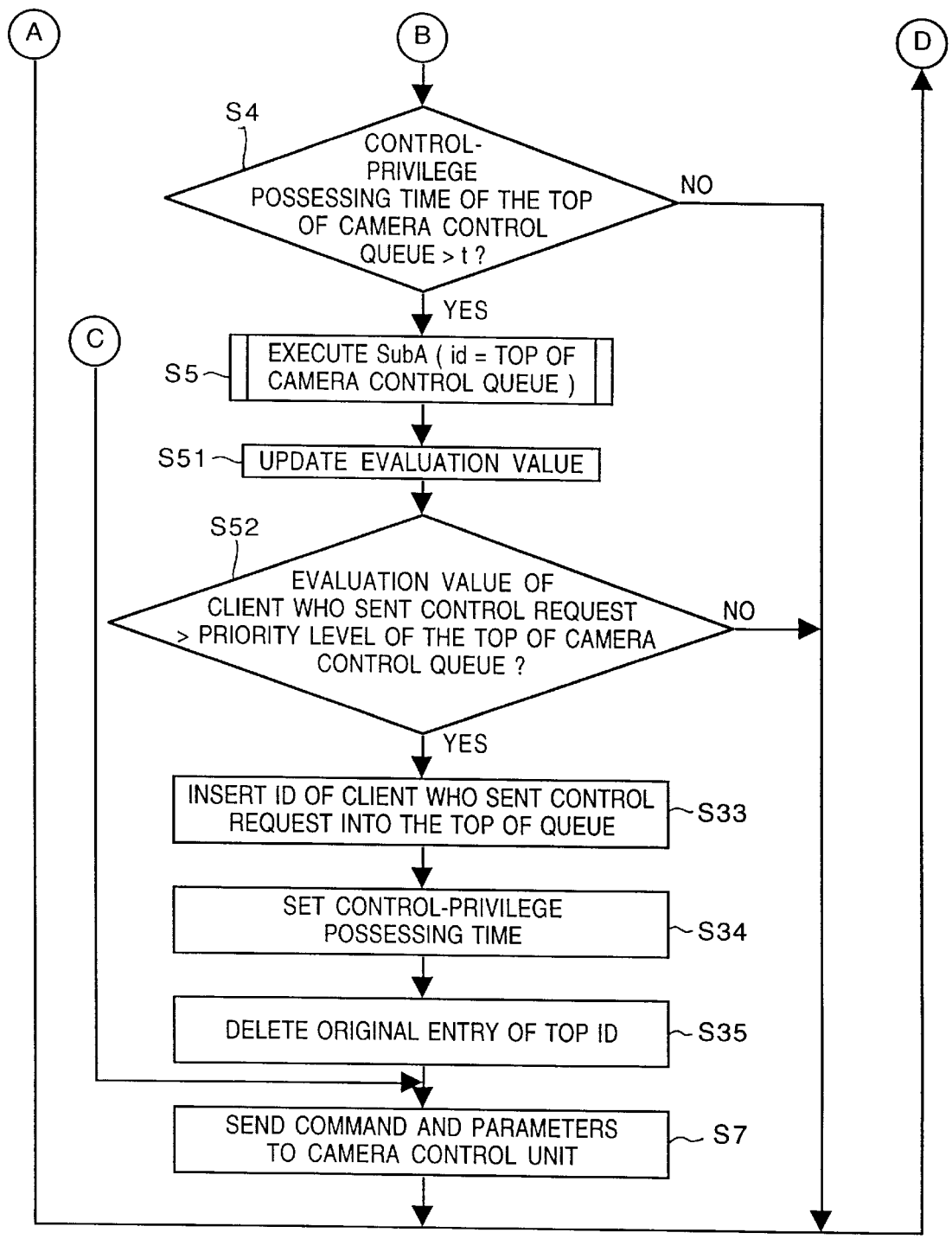

FIG. 17A and FIG. 17B are flowcharts showing control steps of the camera control server according to the sixth embodiment. In FIG. 17A and FIG. 17B, those processing steps which execute the identical processing to the steps in FIG. 11 are referred to by the same reference step numerals. Upon updating the camera control queue by the processing similar to that explained in the fourth embodiment (step S5), an evaluation value is updated in step S51. Herein, the priority level of each client registered in the camera control queue is obtained from the table such as that shown in FIG. 10, and the priority level corresponding to each evaluation value is added. As a result, an evaluation value, taking account of both the priority level and the waiting time in the camera control queue, is obtained.

In step S52, comparison is made between the evaluation value of a client who has sent a camera control request and an evaluation value of a client who is the top of the camera control queue. If the evaluation value of the client who has sent the camera control request is larger than the evaluation value of the client who is the top of the camera control queue, the client who has sent the camera control request is inserted into the top of the camera control queue (step S33).

As set forth above, according to the sixth embodiment, a priority level of each client and registration order of the camera control queue are both taken into consideration when granting a control privilege.

Note that, in FIG. 17A and FIG. 17B, processing after branching off to "NO" in step S4 may proceed to the processing before step S52. By this, a control privilege is granted based on an evaluation value, regardless of a control-privilege possessing time.

As has been described above, according to each of the above embodiments, it is possible to manage a control request of controlling an image input apparatus sent from a remote location. In addition, by limiting each user the time of keeping the control privilege, it is possible to smoothly shift the control privilege of the image input apparatus, thus allowing plural users to fairly control the image input apparatus.

In addition, the client who currently possesses the control privilege can continuously keep the privilege, regardless of the time period that the client has been possessing the control-privilege, unless another control request is sent by other clients. Accordingly, it is possible to manage the camera control privilege in correspondence with a volume of traffic of control requests issued by clients.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an opticle disk, a magneto-optical disk, a CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As has been described above, according to the present invention, it is possible to appropriately manage the control privilege for controlling an image sensing apparatus, in response to a plurality of image-sensing-apparatus control requests.

In addition, according to the present invention, it is possible to appropriately control a time period one client can keep the control privilege, in accordance with a receiving state of control requests.

As many apparently widely different embodiments of the present invention can be made without departing from the spirit and scope thereof, it is to be understood that the invention is not limited to the specific embodiments thereof except as defined in the claims.

What is claimed is:

1. An image input system comprising:

detecting means for detecting issuance of a control request of controlling the image sensing apparatus from a client;

registering means for registering the client who is an issuer of the control request detected by said detecting means, in a waiting queue for obtaining the control privilege of an image sensing apparatus;

determining means for determining whether or not shifting of the control privilege should be executed on the basis of a control-privilege possessing time of a client who currently has the control privilege; and updating means for updating contents of the waiting queue when said determining means determines to execute shifting of the control privilege.

2. The image input system according to claim 1, further comprising executing means for, when the client who is the issuer of the control request reaches the top of the waiting queue as a result of updating the waiting queue by said updating means, executing control of the image sensing apparatus based on the control request.

3. The image input system according to claim 1, further comprising notifying means for, in a case where the client who is the issuer of the control request does not reach the top of the waiting queue as a result of updating the waiting queue by said updating means, notifying the client who is the issuer of the control request that the control request has been turned down.

4. The image input system according to claim 1, further comprising:

calculating means for, in a case where the client who is the issuer of the control request does not reach the top of the waiting queue as a result of updating the waiting queue by said updating means, calculating an approximately waiting time for which the client who is the issuer of the control request must wait to obtain the control privilege, on the basis of a registration state of the waiting queue; and notifying means for notifying of the waiting time calculated by said calculating means to the client who is the issuer of the control request.

5. The image input system according to claim 1, further comprising:

calculating means for, in a case where said determining means determines that shifting of said control privilege is unnecessary, calculating an approximately waiting time for which the client who is the issuer of the control request must wait to obtain the control privilege, on the basis of a remaining time of the control-privilege possessing time of the client who currently has the control privilege and a registration state of the waiting queue; and notifying means for notifying of the waiting time calculating by said calculating means to the client who is the issuer of the control request.

6. The image input system according to claim 1, wherein said determining means determines whether or not shifting of the control privilege should be executed on the basis of the control-privilege possessing time of the client who currently has the control privilege and a time which has passed since the client last issued a control request.

7. The image input system according to claim 1, wherein said determining means comprises:

first determining means for determining whether or not the control-privilege possessing time of the client who currently has the control privilege exceeds a predetermined time; and second determining means for determining whether or not the time which has passed since the client last issued a control request exceeds a predetermined time, wherein in a case where the client, who is an issuer of the control request detected by said detecting means, does not possess the control privilege, said first determining means and said determining means make their determination, and if one of determining conditions is satisfied, said determining means determines to execute shifting of the control privilege.

8. The image input system according to claim 1, wherein in a case where said determining means determines to execute shifting of the control privilege, said updating means updates the contents of the waiting queue on the basis of a priority level of registered clients.

9. The image input system according to claim 1, further comprising:

storing means for storing priority information in which priority levels of the plurality of clients are registered;

comparing means for, upon obtaining a priority level of a client who is the top of the waiting queue updated by said updating means, and a priority level of the client who is the issuer of the control request, comparing both of the priority levels; and providing means for, if the priority level of the client who is the issuer of the control request is higher than the priority level of the client who is the top of the waiting queue as a result of comparison by said comparing means, providing the client who is the issuer of the control request with the control privilege by inserting the client who is the issuer of the control request to the top of the waiting queue.

10. The image input system according to claim 1, further comprising:

storing means for storing control-time information in which each control-allowed time of the plurality of clients is registered, wherein in a case where the client, who is an issuer of the control request detected by said detecting means, does not possess the control privilege, said determining means obtains a control-allowed time of the client who currently has the control privilege from said storing means, and determines to execute shifting of the control privilege if the control-privilege possessing time of said client exceeds the obtained control-allowed time.

11. The image input system according to claim 1, further comprising:

storing means for storing password information in which specific data for specifying a client and a password set for each client are stored in an established correspondence; and receiving means for receiving a registering request from a client which requests registration in the waiting queue, said registering request including specific data and a password to specify the client, wherein said registering means registers the client in the waiting queue for obtaining the control privilege of the image sensing apparatus, if the specific data and the password included in the registering request coincide with password data stored in said storing means.

12. The image input system according to claim 1, further comprising:

storing means for storing priority levels of the plurality of clients;

increasing means for increasing an evaluation value of the plurality of clients, who have been registered by said registering means, by a predetermined value at an interval of a predetermined time period;

adding means for, each time the waiting queue is updated by said updating means, adding each priority level to an evaluation value of each client which is registered in the waiting queue;

comparing means for, updating the waiting queue, comparing an evaluation value of the client who is the top of the waiting queue with an evaluation value of the client who is the issuer of the control request; and providing means for, if the evaluation value of the client who is the issuer of the control request is higher than the evaluation value of the client who is the top of the waiting queue as a result of comparison by said comparing means, providing the client who is the issuer of the control request with the control privilege by inserting the client who is the issuer of the control request to the top of the waiting queue.

13. The image input system according to claim 1, further comprising notifying means for notifying client who is the top of the waiting queue that the client can perform control.

14. The image input system according to claim 13, wherein said notifying means sends a notification no earlier than completion of updating contents of the waiting queue executed by said updating means.

15. The image input system according to claim 13, wherein said notifying means sends the notification at an interval of a predetermined time period.

16. An image input system comprising:

detecting means for detecting issuance of a control request of controlling the image sensing apparatus from a client;

registering means for registering a client who is an issuer of the control request detected by said detecting means, in a waiting queue for obtaining the control privilege of an image sensing apparatus;

storing means for storing priority levels of the plurality of clients;

comparing means for comparing a priority level of a client who is the top of the waiting queue with a priority level of the client who is the issuer of the control request upon obtaining both of the priority levels;

providing means for, if the priority level of the client who is the issuer of the control request is higher than the priority level of the client who is the top of the waiting queue as a result of comparison by said comparing means, providing the client who is the issuer of the control request with the control privilege by inserting the client who is the issuer of the control request to the top of the waiting queue.

17. An image input system comprising:

storing means for storing password information in which specific data for specifying a client and a password set for each client are stored in an established correspondence;

receiving means for receiving a registering request from a client which requests registration in the waiting queue, said registering request including specific data and a password to specify the client;

registering means for, if the specific data and the password included in the registering request coincide with password data stored in said storing means, registering the client in the waiting queue for obtaining the control privilege of an image sensing apparatus;

detecting means for detecting issuance of a control request of controlling the image sensing apparatus from one of a plurality of clients who have been registered by said registering means; and updating means for, when said detecting means detects issuance of the control request, updating contents of the waiting queue on the basis of a registration state of the waiting queue.

18. An image input system comprising:

detecting means for detecting issuance of a control request of controlling the image sensing apparatus from a client;

registering means for registering a client who is an issuer of the control request detected by said detecting means, in a waiting queue for obtaining the control privilege of an image sensing apparatus;

storing means for storing priority levels of the plurality of clients;

increasing means for increasing an evaluation value of the plurality of clients, who have been registered by said registering means, by a predetermined value at an interval of a predetermined time period;

updating means for, when said detecting means detects issuance of the control request, updating contents of the waiting queue on the basis of a registration state of the waiting queue;

adding means for, each time the waiting queue is updated by said updating means, adding each priority level to an evaluation value of each client which is registered in the waiting queue;

comparing means for comparing an evaluation value of the client who is the top of the waiting queue with an evaluation value of the client who is the issuer of the control request; and providing means for, if the evaluation value of the client who is the issuer of the control request is higher than the evaluation value of the client who is the top of the waiting queue as a result of comparison by said comparing means, providing the client who is the issuer of the control request with the control privilege by inserting the client who is the issuer of the control request to the top of the waiting queue.

19. An image server apparatus connectable with a plurality of client apparatuses via a network, comprising:

detecting means for detecting issuance of a control request of controlling the image sensing apparatus from a client;

registering means for registering a client who is an issuer of the control request detected by said detecting means in a waiting queue for obtaining the control privilege of an image sensing apparatus;

determining means for determining whether or not shifting of the control privilege should be executed on the basis of a control-privilege possessing time of a client who currently has the control privilege; and updating means for updating contents of the waiting queue when said determining means determines to execute shifting of the control privilege.

20. An image server apparatus connectable with a plurality of client apparatuses via a network, comprising:

detecting means for detecting issuance of a control request of controlling the image sensing apparatus from a client;

registering means for registering a client who is an issuer of the control request detected by said detecting means, in a waiting queue for obtaining the control privilege of an image sensing apparatus;

storing means for storing priority levels of the plurality of clients;

comparing means for comparing a priority level of a client who is the top of the waiting queue with a priority level of the client who is the issuer of the control request upon obtaining both of the priority levels;

providing means for, if the priority level of the client who is the issuer of the control request is higher than the priority level of the client who is the top of the waiting queue as a result of comparison by said comparing means, providing the client who is the issuer of the control request with the control privilege by inserting the client who is the issuer of the control request to the top of the waiting queue.

21. An image server apparatus connectable with a plurality of client apparatuses via a network, comprising:

storing means for storing password information in which specific data for specifying a client and a password set for each client are stored in an established correspondence;

receiving means for receiving a registering request from a client which requests registration in the waiting queue, said registering request including specific data and a password to specify the client;

registering means for, if the specific data and the password included in the registering request coincide with password data stored in said storing means, registering the client in the waiting queue for obtaining the control privilege of an image sensing apparatus;

detecting means for detecting issuance of a control request of controlling the image sensing apparatus from one of a plurality of clients who have been registered by said registering means; and updating means for, when said detecting means detects issuance of the control request, updating contents of the waiting queue on the basis of a registration state of the waiting queue.

22. An image server apparatus connectable with a plurality of client apparatuses via a network, comprising:

detecting means for detecting issuance of a control request of controlling the image sensing apparatus from a client;

registering means for registering a client who is an issuer of the control request detected by said detecting means, in a waiting queue for obtaining the control privilege of an image sensing apparatus;

storing means for storing priority levels of the plurality of clients;

increasing means for increasing an evaluation value of the plurality of clients, who have been registered by said registering means, by a predetermined value at an interval of a predetermined time period;

updating means for, when said detecting means detects issuance of the control request, updating contents of the waiting queue on the basis of a registration state of the waiting queue;

adding means for, each time the waiting queue is updated by said updating means, adding each priority level to an evaluation value of each client which is registered in the waiting queue;

comparing means for comparing an evaluation value of the client who is the top of the waiting queue with an evaluation value of the client who is the issuer of the control request; and providing means for, if the evaluation value of the client who is the issuer of the control request is higher than the evaluation value of the client who is the top of the waiting queue as a result of comparison by said comparing means, providing the client who is the issuer of the control request with the control privilege by inserting the client who is the issuer of the control request to the top of the waiting queue.

23. A control method of controlling an image server apparatus connectable with a plurality of client apparatuses via a network, comprising the steps of:

a detecting issuance of a control request of controlling the image sensing apparatus from a client;

registering a client who is an issuer of the control request detected in the detecting step, in a waiting queue for obtaining the control privilege of an image sensing apparatus; determining whether or not shifting of the control privilege should be executed on the basis of a control-privilege possessing time of a client who currently has the control privilege; and updating contents of the waiting queue when determination is made in said determining step to execute shifting of the control privilege.

24. A control method of controlling an image server apparatus connectable with a plurality of client apparatuses via a network, comprising the steps of:

storing priority levels of the plurality of clients in a memory;

detecting issuance of a control request of controlling the image sensing apparatus from a client;

registering a client who is an issuer of the control request detected in the detecting step, in a waiting queue for obtaining the control privilege of an image sensing apparatus; obtaining from the memory a priority level of a client who is the top of the waiting queue, and a priority level of the client who is the issuer of the control request, and comparing both of the priority levels;

if the priority level of the client who is the issuer of the control request is higher than the priority level of the client who is the top of the waiting queue as a result of comparison in said comparing step, providing the client who is the issuer of the control request with the control privilege by inserting the client who is the issuer of the control request to the top of the waiting queue.

25. A control method of controlling an image server apparatus connectable with a plurality of client apparatuses via a network, comprising the steps of:

storing, in a memory, password information in which specific data for specifying a client and a password set for each client are stored in an established correspondence;

receiving a registering request from a client which requests registration in the waiting queue, said registering request including specific data and a password to specify the client;

if the specific data and the password included in the registering request coincide with password data stored in the memory, registering the client in the waiting queue for obtaining the control privilege of an image sensing apparatus;

detecting receipt of a control request of controlling the image sensing apparatus via the network from one of a plurality of clients who have been registered in said registering step; and when the control request is detected in said detecting step, updating contents of the waiting queue on the basis of a registration state of the waiting queue.

26. A control method of controlling an image server apparatus connectable with a plurality of client apparatuses via a network, comprising the steps of:

storing priority levels of the plurality of clients in a memory;

detecting issuance of a control request of controlling the image sensing apparatus from a client;

registering a client who is an issuer of the controller request detected in the detecting step, in a waiting queue for obtaining the control privilege of an image sensing apparatus;

increasing an evaluation value of the plurality of clients, who have been registered in said registering step, by a predetermined value at an interval of a predetermined time period;

when the control request is detected in said detecting step, updating contents of the waiting queue on the basis of a registration state of the waiting queue;

each time the waiting queue is updated in said updating step, adding each priority level which is stored in the memory to an evaluation value of each client which is registered in the waiting queue;

comparing an evaluation value of the client who is the top of the waiting queue with an evaluation value of the client who is the issuer of the control request; and if the evaluation value of the client who is the issuer of the control request is higher than the evaluation value of the client who is the top of the waiting queue as a result of comparison in said comparing step, providing the client who is the issuer of the control request with the control privilege by inserting the client who is the issuer of the control request to the top of the waiting queue.

27. A computer readable memory having control program codes for controlling an image input control apparatus, which is connectable to a plurality of client apparatuses via a network, comprising:

detecting process procedure codes for detecting issuance of a control request of controlling the image sensing apparatus from a client;

registering process procedure codes for registering a client who is an issuer of the control request detected in said detecting process procedure, in a waiting queue for obtaining the control privilege of an image sensing apparatus;

determining process procedure codes for determining whether or not shifting of the control privilege should be executed on the basis of a control-privilege possessing time of a client who currently has the control privilege; and updating process procedure codes for updating contents of the waiting queue when determination is made in said determining step to execute shifting of the control privilege.

28. A computer readable memory having control program codes for controlling an image input control apparatus, which is connectable to a plurality of client apparatuses via a network, comprising:

storing process procedure codes for storing priority levels of the plurality of clients in a memory;

detecting process procedure for detecting issuance of a control request of controlling the image sensing apparatus from a client;

registering process procedure codes for registering a client who is an issuer of the control request detected in said detecting process procedure, in a waiting queue for obtaining the control privilege of an image sensing apparatus;

comparing process procedure codes for obtaining from the memory a priority level of a client who is the top of the waiting queue, and a priority level of the client who is the issuer of the control request, and comparing both of the priority levels;

providing process procedure codes for, if the priority level of the client who is the issuer of the control request is higher than the priority level of the client who is the top of the waiting queue as a result of comparison in said comparing step, providing the client who is the issuer of the control request with the control privilege by inserting the client who is the issuer of the control request to the top of the waiting queue.

29. A computer readable memory having control program codes for controlling an image input control apparatus, which is connectable to a plurality of client apparatuses via a network, comprising:

storing process procedure codes for storing, in a memory, password information in which specific data for specifying a client and a password set for each client are stored in an established correspondence;

receiving process procedure codes for receiving a registering request from a client which requests registration in the waiting queue, said registering request including specific data and a password to specify the client;

registering process procedure codes for, if the specific data and the password included in the registering request coincide with password data stored in the memory, registering the client in the waiting queue for obtaining the control privilege of an image sensing apparatus;

detecting process procedure codes for detecting receipt of a control request of controlling the image sensing apparatus via the network from one of a plurality of clients who have been registered in said registering step; and updating process procedure codes for, when the control request is detected in said detecting step, updating contents of the waiting queue on the basis of a registration state of the waiting queue.

30. A computer readable memory having control program codes for controlling an image input control apparatus, which is connectable to a plurality of client apparatuses via a network, comprising:

storing process procedure codes for storing priority levels of the plurality of clients in a memory;

detecting process procedure codes for detecting issuance of a control request of controlling the image sensing apparatus from a client;

registering process procedure codes for registering a client who is an issuer of the control request detected in said detecting process procedure, in a waiting queue for obtaining the control privilege of an image sensing apparatus;

increasing process procedure codes for increasing an evaluation value of the plurality of clients, who have been registered in said registering step, by a predetermined value at an interval of a predetermined time period;

detecting process procedure codes for detecting issuance of a control request of controlling the image sensing apparatus from one of the plurality of clients who have been registered in said registering step;

updating process procedure codes for, when the control request is detected in said detecting step, updating contents of the waiting queue on the basis of a registration state of the waiting queue;

adding process procedure codes for, each time the waiting queue is updated in said updating step, adding each priority level which is stored in the memory to an evaluation value of each client which is registered in the waiting queue;

comparing process procedure codes for comparing an evaluation value of the client who is the top of the waiting queue with an evaluation value of the client who is the issuer of the control request; and providing process procedure codes for, if the evaluation value of the client who is the issuer of the control request is higher than the evaluation value of the client who is the top of the waiting queue as a result of comparison in said comparing step, providing the client who is the issuer of the control request with the control privilege by inserting the client who is the issuer of the control request to the top of the waiting queue.

31. An image imput system comprising:

detecting means for detecting issuance of a request of control privilege of an image sensing apparatus from a client;

registering means for registering a client who is an issuer of the control request detected by said detecting means;

receiving means for receiving a control privilege abandon notification message from a client registered by said registering means;

updating means for updating contents of the waiting queue when said receiving means receives the control privilege abandon notification message.

32. A controlling method of an image input system comprising the steps of:

detecting issuance of a request of control privilege of an image sensing aparatus from a client;

registering a client who is an issuer of the control request detected in the detecting step;

receiving a control privilege abandon notification message from a client registered in the registering step;

updating contents of the waiting queue when the control privilege abandon notification message is received in the receiving step.

33. A computer readable memory having control program codes for controlling an image input system, comprising:

detecting process procedure codes for detecting issuance of a request of control privilege of an image sensing apparatus from a client;

registering process procedure codes for registering a client who is an issuer of the control request detected in said detecting process procedure;

receiving process procedure codes for receiving a control privilege abandon notification message from a client registered in said registering process procedure;

updating process procedure for updating contents of the waiting queue when the control privilege abandon notification message is received in said receiving process procedure.

* * * * *

UNITED STATES PATENT AND TRADEMARK OFFICE
CERTIFICATE OF CORRECTION

PATENT NO. : 6,067,624
DATED : May 23, 2000
INVENTOR(S) : Tomoko Kuno

It is certified that error appears in the above-identified patent and that said Letters Patent is hereby corrected as shown below:

Column 10,
Line 2, "request is used" should read -- request is issued --.
Line 28, "camera-control-priority priority table" should read -- camera-control-priority table --.

Column 12,
Line 5, "request.If" should read -- request. It --.

Column 14,
Line 44, "an opticle disk," should read -- an optical disk, --.

Column 15, claim 4,
Lines 44-45, "approximately" should read -- approximate --.

Column 15, claim 5,
Line 56, "approximately" should read -- approximate --;
Lines 63-64, "calculating by" should read -- calculated by --.

Column 17, claim 12,
Line 18, "for, updating" should read -- for, upon updating --.

Column 18, claim 18,
Line 25, "storing priority levels" should read -- storing levels --;
Lines 46-47, "comparing means," should read -- comparison means, --.

Column 18, claim 19,
Line 53, "network, comprising:" should read -- network comprising: --.

Column 19, claim 22,
Line 50, "network, comprising:" should read -- network comprising: --.

Column 20, claim 23,
Line 20, "a detecting issuance" should read -- detecting issuance --.

UNITED STATES PATENT AND TRADEMARK OFFICE
CERTIFICATE OF CORRECTION

PATENT NO.   : 6,067,624
DATED        : May 23, 2000
INVENTOR(S)  : Tomoko Kuno

It is certified that error appears in the above-identified patent and that said Letters Patent is hereby corrected as shown below:

Column 22, claim 28,
Line 5, "procedure for" should read -- procedure codes for --.

Signed and Sealed this

Twenty-fifth Day of December, 2001

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,067,624
DATED : May 23, 2000
INVENTOR(S) : Tomoko Kuno

It is certified that error appears in the above-identified patent and that said Letters Patent is hereby corrected as shown below:

Column 10,
Line 2, "request is used" should read -- request is issued --.
Line 28, "camera-control-priority priority table" should read -- camera-control-priority table --.

Column 12,
Line 5, "request.If" should read -- request. It --.

Column 14,
Line 44, "an opticle disk," should read -- an optical disk, --.

Column 15, claim 4,
Lines 44-45, "approximately" should read -- approximate --.

Column 15, claim 5,
Line 56, "approximately" should read -- approximate --;
Lines 63-64, "calculating by" should read -- calculated by --.

Column 17, claim 12,
Line 18, "for, updating" should read -- for, upon updating --.

Column 18, claim 18,
Line 25, "storing priority levels" should read -- storing levels --;
Lines 46-47, "comparing means," should read -- comparison means, --.

Column 18, claim 19,
Line 53, "network, comprising:" should read -- network comprising: --.

Column 19, claim 22,
Line 50, "network, comprising:" should read -- network comprising: --.

Column 20, claim 23,
Line 20, "a detecting issuance" should read -- detecting issuance --.

UNITED STATES PATENT AND TRADEMARK OFFICE
CERTIFICATE OF CORRECTION

PATENT NO.   : 6,067,624
DATED        : May 23, 2000
INVENTOR(S)  : Tomoko Kuno

It is certified that error appears in the above-identified patent and that said Letters Patent is hereby corrected as shown below:

Column 22, claim 28,
Line 5, "procedure for" should read -- procedure codes for --.

Signed and Sealed this

Eighth Day of January, 2002

Attest:

Attesting Officer

JAMES E. ROGAN
Director of the United States Patent and Trademark Office